US008306007B2

(12) United States Patent
Sato

(10) Patent No.: US 8,306,007 B2
(45) Date of Patent: Nov. 6, 2012

(54) VECTOR QUANTIZER, VECTOR INVERSE QUANTIZER, AND METHODS THEREFOR

(75) Inventor: Kaoru Sato, Kanagawa (JP)

(73) Assignee: Panasonic Corporation, Osaka (JP)

( * ) Notice: Subject to any disclaimer, the term of this patent is extended or adjusted under 35 U.S.C. 154(b) by 358 days.

(21) Appl. No.: 12/812,113

(22) PCT Filed: Jan. 15, 2009

(86) PCT No.: PCT/JP2009/000133

§ 371 (c)(1), (2), (4) Date: Jul. 8, 2010

(87) PCT Pub. No.: WO2009/090876

PCT Pub. Date: Jul. 23, 2009

(65) Prior Publication Data

US 2010/0284392 A1 Nov. 11, 2010

(30) Foreign Application Priority Data

Jan. 16, 2008 (JP) ................................ 2008-007255
May 30, 2008 (JP) ................................ 2008-142442
Nov. 28, 2008 (JP) ................................ 2008-304660

(51) Int. Cl.
*H04B 7/216* (2006.01)

(52) U.S. Cl. ........................................ 370/342; 370/441

(58) Field of Classification Search ........................ None
See application file for complete search history.

(56) References Cited

U.S. PATENT DOCUMENTS 6,018,707 A 1/2000 Nishiguchi et al.
6,334,105 B1 12/2001 Ehara
7,392,179 B2 6/2008 Yasunaga et al.
2009/0198491 A1 8/2009 Sato et al.
2009/0292537 A1* 11/2009 Ehara et al. .................. 704/230

(Continued)

FOREIGN PATENT DOCUMENTS

JP 10-097300 4/1998
WO 00/11646 3/2000

(Continued)

OTHER PUBLICATIONS

Lee et al. "Cell-conditioned multistage vector quantization", Acoustics, Speech, and Signal Processing, Apr. 1991.*

(Continued)

*Primary Examiner* — Jianye Wu
(74) *Attorney, Agent, or Firm* — Greenblum & Bernstein, P.L.C.

(57) ABSTRACT

Disclosed is a vector quantizer capable of improving the quantization accuracy of vector quantization to switch over the codebook of the vector quantization of a first stage depending on the type of feature having a correlation with a vector to be quantized. In the quantizer, a classifier (101) selects a classification code vector indicating the type of feature having the correlation with the vector to be quantized from a plurality of classification code vectors. A switch (102) selects a first codebook corresponding to the type from a plurality of first codebooks. An error minimizing section (105) selects a first code vector closest to the vector to be quantized from a plurality of first code vectors constituting the selected first codebook. An additivity factor determining section (106) selects an additivity factor vector corresponding to the type from a plurality of additivity factor vectors. The error minimizing section (105) selects a second code vector closest to the residual vector between the selected first code vector and the vector to be quantized from a plurality of second code vectors by using the selected additivity factor vector.

9 Claims, 12 Drawing Sheets

U.S. PATENT DOCUMENTS

| | | | |
|---|---|---|---|
| 2010/0063804 | A1 | 3/2010 | Sato et al. |
| 2010/0082337 | A1 | 4/2010 | Sato et al. |
| 2010/0106492 | A1 | 4/2010 | Sato et al. |
| 2010/0211398 | A1 | 8/2010 | Satoh et al. |

FOREIGN PATENT DOCUMENTS

| | | |
|---|---|---|
| WO | 2006/030865 | 3/2006 |
| WO | 2008/047795 | 4/2008 |

OTHER PUBLICATIONS

Etemoglu et al. "Structured vector quantization using linear transforms", Signal Processing, IEEE Transactions, No. 6, pp. 1625-1631, Jun. 2003.*

Barnes et al. "Advances in residual vector quantization: a review", Image Processing, IEEE Transactions, vol. 5, No. 2, pp. 226-262, Feb. 1996.*

U.S. Appl. No. 12/445,812 to Kaoru Sato et al., filed Apr. 16, 2009.

U.S. Appl. No. 12/810,049 to Kaoru Satoh et al., filed Jun. 22, 2010.

Allen Gersho, Robert M. Gray, translated by Yoshii and three others, "Vector Quantization and Signal Compression," Corona Publishing Co.,Ltd, Nov. 10, 1998, pp. 506 and 524 to 531, English Translation published by Kluwer Academic Publishers, Copyright 1992, pp. 434 and 450 to 459.

* cited by examiner

VECTOR QUANTIZER, VECTOR INVERSE QUANTIZER, AND METHODS THEREFOR

TECHNICAL FIELD

The present invention relates to a vector quantization apparatus, vector dequantization apparatus, and quantization and dequantization methods for performing vector quantization of LSP (Line Spectral Pair) parameters. In particular, the present invention relates to a vector quantization apparatus, vector dequantization apparatus, and quantization and dequantization methods for performing vector quantization of LSP parameters used in a speech coding and decoding apparatus that transmits speech signals in the fields of a packet communication system represented by Internet communication, a mobile communication system, and so on.

BACKGROUND ART

In the field of digital wireless communication, packet communication represented by Internet communication and speech storage, speech signal coding and decoding techniques are essential for effective use of channel capacity and storage media for radio waves. In particular, a CELP (Code Excited Linear Prediction) speech coding and decoding technique is a mainstream technique.

A CELP speech coding apparatus encodes input speech based on pre-stored speech models. To be more specific, the CELP speech coding apparatus separates a digital speech signal into frames of regular time intervals (e.g. approximately 10 to 20 ms), performs a linear predictive analysis of a speech signal on a per frame basis to find the linear prediction coefficients ("LPC's") and linear prediction residual vector, and encodes the linear prediction coefficients and linear prediction residual vector separately. As a method of encoding linear prediction coefficients, generally, linear prediction coefficients are converted into LSP (Line Spectral Pair) parameters and these LSP parameters are encoded. Also, as a method of encoding LSP parameters, vector quantization is often performed for LSP parameters. Here, vector quantization refers to the method of selecting the most similar code vector to the quantization target vector from a codebook having a plurality of representative vectors (i.e. code vectors), and outputting the index (code) assigned to the selected code vector as a quantization result. In vector quantization, the codebook size is determined based on the amount of information that is available. For example, when vector quantization is performed using an amount of information of 8 bits, a codebook can be formed using 256 ($=2^8$) types of code vectors.

Also, to reduce the amount of information and the amount of calculations in vector quantization, various techniques are used, including MSVQ (Multi-Stage Vector Quantization) and SVQ (Split Vector Quantization) (see Non-Patent Document 1). Here, multi-stage vector quantization is a method of performing vector quantization of a vector once and further performing vector quantization of the quantization error, and split vector quantization is a method of quantizing a plurality of split vectors acquired by splitting a vector.

Also, there is a technique of performing vector quantization suitable for LSP features and further improving LSP coding performance, by adequately switching the codebook to use in vector quantization based on speech features that are correlated with the quantization target LSP's (e.g. information about the voiced characteristic, unvoiced characteristic and mode of speech). For example, in scalable coding, vector quantization of wideband LSP's are carried out by utilizing the correlations between wideband LSP's (which are LSP's found from wideband signals) and narrowband LSP's (which are LSP's found from narrowband signals), classifying the narrowband LSP's based on their features and switching the codebook in the first stage of multi-stage vector quantization based on the types of narrowband LSP features (hereinafter abbreviated to "types of narrowband LSP's").

Non-Patent Document 1: Allen Gersho, Robert M. Gray, translated by Yoshii and three others, "Vector Quantization and Signal Compression," Corona Publishing Co., Ltd, 10 Nov. 1998, pages 506 and 524 to 531

DISCLOSURE OF INVENTION

Problems to be Solved by the Invention

In the above multi-stage vector quantization, first-stage vector quantization is performed using a codebook associated with the narrowband LSP type, and therefore the distribution of quantization errors in first-stage vector quantization varies between the types of narrowband LSP's. However, a single common codebook is used in second and later stages of vector quantization regardless of the types of narrowband LSP's, and therefore a problem arises that the accuracy of vector quantization in second and later stages is insufficient.

FIG. 1 illustrates problems with the above multi-stage vector quantization. In FIG. 1, the black circles show two-dimensional vectors, the dashed-line circles typically show the size of distribution of vector sets, and the circle centers show the vector set averages. Also, in FIG. 1, CBa1, CBa2, . . . , and CBan are associated with respective types of narrowband LSP's, and represent a plurality of codebooks used in the first stage of vector quantization. CBb represents a codebook used in the second stage of vector quantization.

As shown in FIG. 1, as a result of performing first-stage vector quantization using codebooks CBa1, CBa2, . . . , and CBan, the averages of quantization error vectors vary (i.e. the centers of the dashed-line circles representing distribution vary). If second-stage vector quantization is performed for these quantization error vectors of varying averages using the common second code vectors, the accuracy of quantization in a second stage degrades.

It is therefore an object of the present invention to provide a vector quantization apparatus, vector dequantization apparatus, and quantization and dequantization methods for improving the accuracy of quantization in second and later stages of vector quantization, in multi-stage vector quantization in which the codebook in the first stage is switched based on the type of a feature correlated with the quantization target vector.

Means for Solving the Problem

The vector quantization apparatus of the present invention employs a configuration having: a first selecting section that selects a classification code vector indicating a type of a feature correlated with a quantization target vector, from a plurality of classification code vectors; a second selecting section that selects a first codebook associated with the selected classification code vector from a plurality of first codebooks; a first quantization section that quantizes the quantization target vector using a plurality of first code vectors forming the selected first codebook, and produces a first code; a third selecting section that selects an additive factor vector associated with the selected classification code vector from a plurality of additive factor vectors; and a second quantization section that quantizes a vector related to a first residual vector between the first code vector indicated by the first code and the quantization target vector, using a plurality of second code vectors and the selected additive factor vector, and produces a second code.

The vector quantization apparatus of the present invention employs a configuration having: a first selecting section that selects a classification code vector indicating a type of a feature correlated with a quantization target vector, from a plurality of classification code vectors; a second selecting section that selects a first codebook associated with the selected classification code vector from a plurality of first codebooks; a first quantization section that quantizes the quantization target vector using a plurality of first code vectors forming the selected first codebook, to produce a first code; a second quantization section that quantizes a vector related to a first residual vector between the first code vector indicated by the first code and the quantization target vector, using a plurality of second code vectors and a first additive factor vector, and produces a second code; a third quantization section that quantizes a second residual vector between the first residual vector and the second code vector, using a plurality of third code vectors and the second additive factor vector, to produce a third code; and a third selecting section that selects the first additive factor vector and the second additive factor vector from the plurality of additive factor vectors.

The vector dequantization apparatus of the present invention employs a configuration having: a receiving section that receives a first code produced by quantizing a quantization target vector in a vector quantization apparatus and a second code produced by further quantizing a quantization error in the quantization in the vector quantization apparatus; a first selecting section that selects a classification code vector indicating a type of a feature correlated with the quantization target vector, from a plurality of classification code vectors; a second selecting section that selects a first codebook associated with the selected classification code vector from a plurality of first codebooks; a first dequantization section that designates a first code vector associated with the first code among a plurality of first code vectors forming the selected first codebook; a third selecting section that selects an additive factor vector associated with the selected classification code vector from a plurality of additive factor vectors; and a second dequantization section that designates a second code vector associated with the second code among a plurality of second code vectors, and produces a quantized vector using the designated second code vector, the selected additive factor vector and the designated first code vector.

The vector quantization method of the present invention includes the steps of: selecting a classification code vector indicating a type of a feature correlated with a quantization target vector, from a plurality of classification code vectors; selecting a first codebook associated with the selected classification code vector from a plurality of first codebooks; quantizing the quantization target vector using a plurality of first code vectors forming the selected first codebook, to produce a first code; selecting an additive factor vector associated with the selected classification code vector from a plurality of additive factor vectors; and quantizing a vector related to a first residual vector between the first code vector indicated by the first code and the quantization target vector, using a plurality of second code vectors and the selected additive factor vector, to produce a second code.

The vector dequantization method of the present invention includes the steps of: receiving a first code produced by quantizing a quantization target vector in a vector quantization apparatus and a second code produced by further quantizing a quantization error in the quantization in the vector quantization apparatus; selecting a classification code vector indicating a type of a feature correlated with the quantization target vector, from a plurality of classification code vectors; selecting a first codebook associated with the selected classification code vector from a plurality of first codebooks; selecting a first code vector associated with the first code from a plurality of first code vectors forming the selected first codebook; selecting an additive factor vector associated with the selected classification code vector from a plurality of additive factor vectors; and selecting a second code vector associated with the second code from a plurality of second code vectors, and producing the quantization target vector using the selected second code vector, the selected additive factor vector and the selected first code vector.

Advantageous Effect of the Invention

According to the present invention, in multi-stage vector quantization in which the codebook in the first stage is switched based on the type of a feature correlated with the quantization target vector, by performing vector quantization in second and later stages using an additive factor associated with the above type, it is possible to improve the accuracy of quantization in second and later stages of vector quantization. Further, upon decoding, it is possible to dequantize vectors using accurately quantized encoded information, so that it is possible to generate decoded signals of high quality.

BEST MODE FOR CARRYING OUT THE INVENTION

Embodiments of the present invention will be explained below in detail with reference to the accompanying drawings. Here, example cases will be explained using an LSP vector quantization apparatus, LSP vector dequantization apparatus, and quantization and dequantization methods as the vector quantization apparatus, vector dequantization apparatus, and quantization and dequantization methods according to the present invention.

Also, example cases will be explained with embodiments of the present invention where wideband LSP's are used as the vector quantization target in a wideband LSP quantizer for scalable coding and where the codebook to use in the first stage of quantization is switched using the narrowband LSP type correlated with the vector quantization target. Also, it is equally possible to switch the codebook to use in the firs stage of quantization, using quantized narrowband LSP's (which are narrowband LSP's quantized in advance by a narrowband LSP quantizer (not shown)), instead of narrowband LSP's. Also, it is equally possible to convert quantized narrowband LSP's into a wideband format and switch the codebook to use in the first stage of quantization using the converted quantized narrowband LSP's.

Also, in embodiments of the present invention, a factor (i.e. vector) to move the centroid (i.e. average) that is the center of a code vector space by applying addition or subtraction to all code vectors forming a codebook, will be referred to as "additive factor."

Also, actually, as in embodiments of the present invention, an additive factor vector is often used to be subtracted from the quantization target vector, instead of adding the additive factor vector to a code vector.

Embodiment 1

Figure 1:
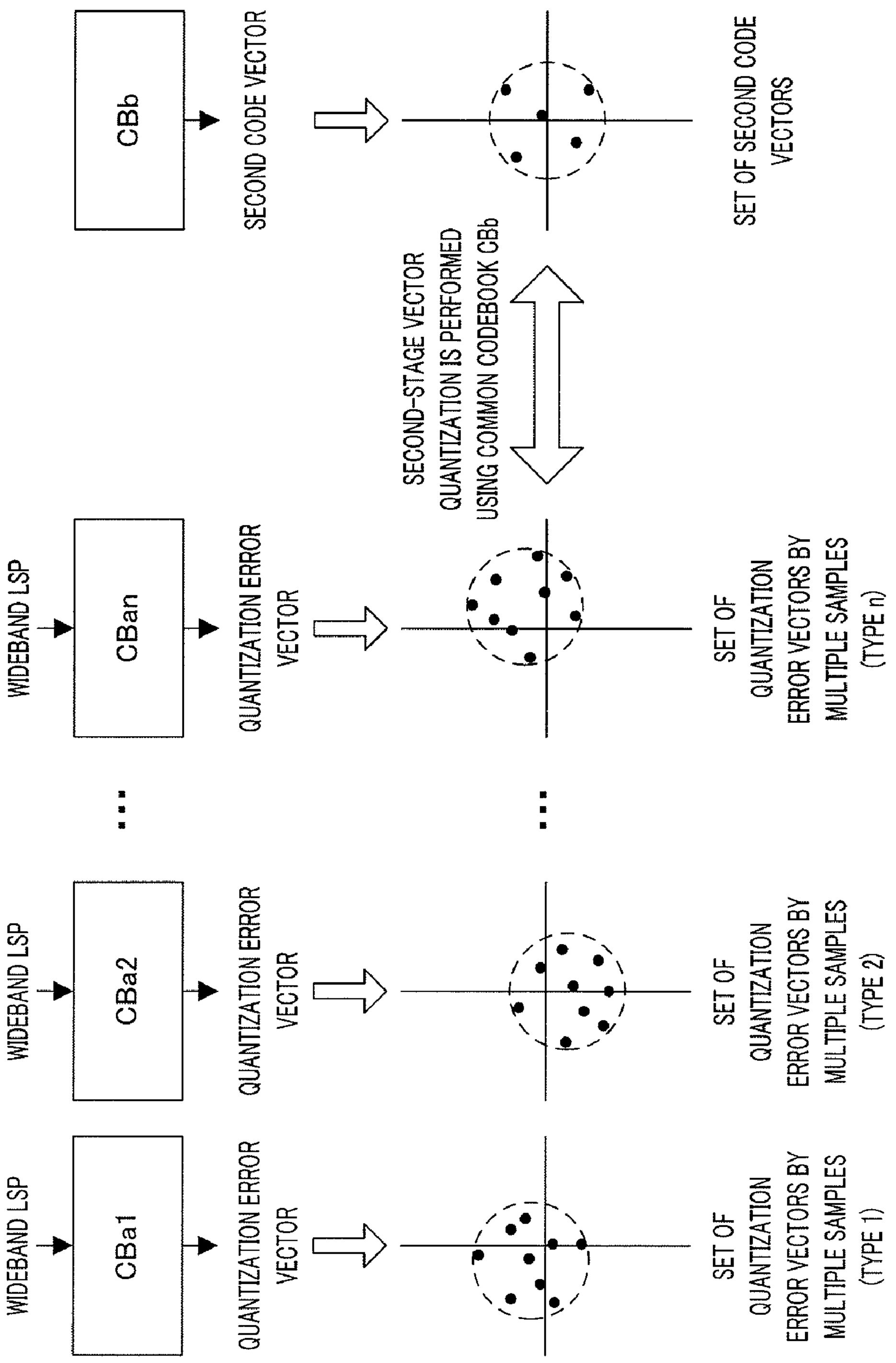
FIG. 1 illustrates problems with multi-vector quantization of the prior art.

FIG. 1 is a block diagram showing the main components of LSP vector quantization apparatus 100 according to Embodiment 1 of the present invention. Here, an example case will be explained where an input LSP vector is quantized by multi-stage vector quantization of three steps in LSP vector quantization apparatus 100.

Figure 2:
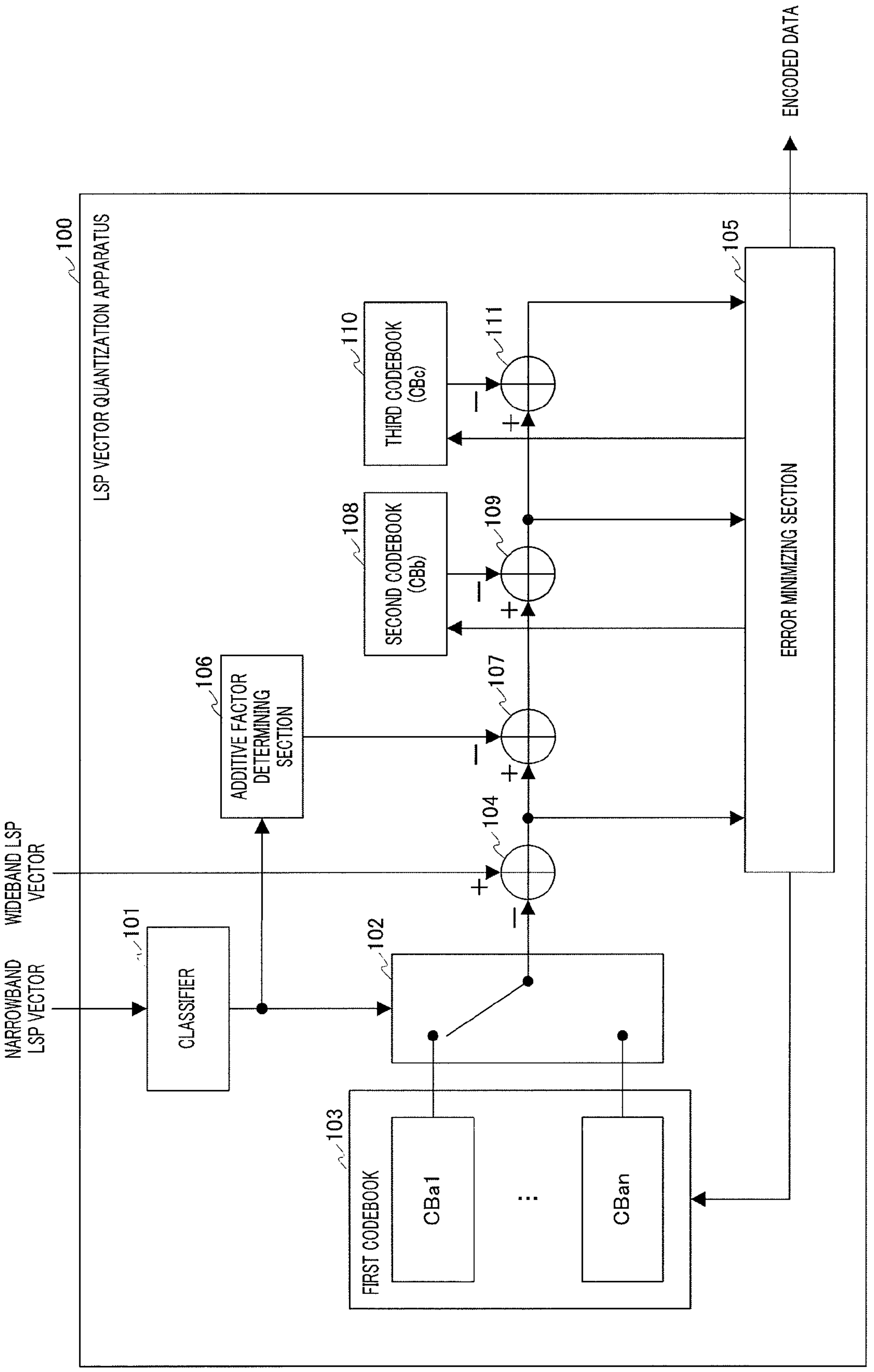
FIG. 2 is a block diagram showing the main components of an LSP vector quantization apparatus according to Embodiment 1 of the present invention.

In FIG. 2, LSP vector quantization apparatus 100 is provided with classifier 101, switch 102, first codebook 103, adder 104, error minimizing section 105, additive factor determining section 106, adder 107, second codebook 108, adder 109, third codebook 110 and adder 111.

Classifier 101 stores in advance a classification codebook formed with a plurality items of classification information indicating a plurality of types of narrowband LSP vectors, selects classification information indicating the type of a wideband LSP vector of the vector quantization target from the classification codebook, and outputs the classification information to switch 102 and additive factor determining section 106. To be more specific, classifier 101 has a built-in classification codebook formed with code vectors associated with the types of narrowband LSP vectors, and finds the code vector to minimize the square error with respect to an input narrowband LSP vector by searching the classification codebook. Further, classifier 101 uses the index of the code vector found by search, as classification information indicating the type of the LSP vector.

From first codebook 103, switch 102 selects one sub-codebook associated with the classification information received as input from classifier 101, and connects the output terminal of the sub-codebook to adder 104.

First codebook 103 stores in advance sub-codebooks (CBa 1 to CBan) associated with the types of narrowband LSP's. That is, for example, when the total number of types of narrowband LSP's is n, the number of sub-codebooks forming first codebook 103 is equally n. From a plurality of first code vectors forming the first codebook, first codebook 103 outputs first code vectors designated by designation from error minimizing section 105, to switch 102.

Adder 104 calculates the differences between a wideband LSP vector received as an input vector quantization target and the code vectors received as input from switch 102, and outputs these differences to error minimizing section 105 as first residual vectors. Further, out of the first residual vectors respectively associated with all first code vectors, adder 104 outputs to adder 107 one minimum residual vector found by search in error minimizing section 105.

Error minimizing section 105 uses the results of squaring the first residual vectors received as input from adder 104, as square errors between the wideband LSP vector and the first code vectors, and finds the first code vector to minimize the square error by searching the first codebook. Similarly, error minimizing section 105 uses the results of squaring second residual vectors received as input from adder 109, as square errors between the first residual vector and second code vectors, and finds the second code vector to minimize the square error by searching the second codebook. Similarly, error minimizing section 105 uses the results of squaring third residual vectors received as input from adder 111, as square errors between the third residual vector and third code vectors, and finds the third code vector to minimize the square error by searching the third codebook. Further, error minimizing section 105 collectively encodes the indices assigned to the three code vectors acquired by search, and outputs the result as encoded data.

Additive factor determining section 106 stores in advance an additive factor codebook formed with additive factors associated with the types of narrowband LSP vectors. Further, from the additive factor codebook, additive factor determining section 106 selects an additive factor vector associated with classification information received as input from classifier 101, and outputs the selected additive factor to adder 107.

Adder 107 calculates the difference between the first residual vector received as input from adder 104 and the additive factor vector received as input from additive factor determining section 106, and outputs the result to adder 109.

Second codebook (CBb) 108 is formed with a plurality of second code vectors, and outputs second code vectors designated by designation from error minimizing section 105, to adder 109.

Adder 109 calculates the differences between the first residual vector, which is received as input from adder 107 and from which the additive factor vector is subtracted, and the second code vectors received as input from second codebook 108, and outputs these differences to error minimizing section 105 as second residual vectors. Further, out of the second residual vectors respectively associated with all second code vectors, adder 109 outputs to adder 111 one minimum second residual vector found by search in error minimizing section 105.

Third codebook 110 (CBc) is formed with a plurality of third code vectors, and outputs third code vectors designated by designation from error minimizing section 105, to adder 111.

Adder 111 calculates the differences between the second residual vector received as input from adder 109 and the third code vectors received as input from third codebook 110, and outputs these differences to error minimizing section 105 as third residual vectors.

Next, the operations performed by LSP vector quantization apparatus 100 will be explained, using an example case where the order of a wideband LSP vector of the quantization target is R. Also, in the following explanation, a wideband LSP vector will be expressed by "LSP(i) (i=0, 1, . . . , R−1)."

Classifier 101 has a built-in classification codebook formed with n code vectors respectively associated with n types of narrowband LSP vectors, and, by searching for code vectors, finds the m-th code vector to minimize the square error with respect to an input narrowband LSP vector. Further, classifier 101 outputs m ($1 \leqq m \leqq n$) to switch 102 and additive factor determining section 106 as classification information.

Switch 102 selects sub-codebook CBam associated with classification information m from first codebook 103, and connects the output terminal of the sub-codebook to adder 104.

From first code vectors $CODE\_1^{(d1)}(i)$ (d1=0, 1, . . . , D1−1, i=0, 1, . . . , R−1) forming CBam among n sub-codebooks CBa1 to CBan, first codebook 103 outputs first code vectors $CODE\_1^{(d1')}(i)$ (i=0, 1, . . . , R−1) designated by designation d1' from error minimizing section 105, to switch 102. Here, D1 represents the total number of code vectors of the first codebook, and d1 represents the index of the first code vector. Further, error minimizing section 105 sequentially designates the values of d1' from d1'=0 to d1'=D1−1, to first codebook 103.

According to following equation 1, adder 104 calculates the differences between wideband LSP vector LSP(i) (i=0, 1, . . . , R−1) received as an input vector quantization target, and first code vectors CODE_1(d1')(i) (i=0, 1, . . . , R−1) received as input from first codebook 103, and outputs these differences to error minimizing section 105 as first residual vectors $Err\_1^{(d1')}(i)$ (i=0, 1, . . . , R−1). Further, among first residual vectors $Err\_1^{(d1')}(i)$ (i=0, 1, . . . , R−1) respectively associated with d1'=0 to d1'=D1−1, adder 104 outputs minimum first residual vector $Err\_1^{(d1\_min)}(i)$ (i=0, 1, . . . , R−1) found by search in error minimizing section 105, to adder 107.

(Equation 1)

$$Err\_1^{(d1')}(i)=LSP(i)-CODE\_1^{(d1')}(i)\ (i=0,1,\ldots,R-1) \quad [1]$$

Error minimizing section 105 sequentially designates the values of d1' from d1'=0 to d1'=D1−1 to first codebook 103, and, with respect to all the values of d1' from d1'=0 to d1'=D1−1, calculates square errors Err by squaring first residual vectors $Err\_1^{(d1')}(i)$ (i=0, 1, . . . , R−1) received as input from adder 104 according to following equation 2.

(Equation 2)

$$Err=\sum_{i=0}^{R-1}\left(Err\_1^{(d1')}(i)\right)^2 \quad [2]$$

Further, error minimizing section 105 stores index d1' of the first code vector to minimize square error Err, as first index d1_min.

Additive factor determining section 106 selects additive factor vector $Add^{(m)}(i)$ (i=0, 1, . . . , R−1) associated with classification information m from an additive factor codebook, and outputs the additive factor vector to adder 107.

According to following equation 3, adder 107 subtracts additive factor vector $Add^{(m)}(i)$ (i=0, 1, . . . , R−1) received as input from additive factor determining section 106, from first residual vector $Err\_1^{(d1\_min)}(i)$ (i=0, 1, . . . , R−1) received as input from adder 104, and outputs resulting $Add\_Err\_1^{(d1\_min)}(i)$ to adder 109.

(Equation 3)

$$Add\_Err\_1^{(d1\_min)}(i)=Err\_1^{(d1\_min)}(i)-Add^{(m)}(i)\ (i=0,1,\ldots,R-1) \quad [3]$$

Second codebook 108 outputs code vectors $CODE\_2^{(d2')}(i)$ (i=0, 1, . . . , R−1) designated by designation d2' from error minimizing section 105, to adder 109, among second code vectors $CODE\_2^{(d2)}(i)$ (d2=0, 1, . . . , D2−1, i=0, 1, . . . , R−1) forming the codebook. Here, D2 represents the total number of code vectors of the second codebook, and d2 represents the index of a code vector. Also, error minimizing section 105 sequentially designates the values of d2' from d2'=0 to d2'=D2−1, to second codebook 108.

According to following equation 4, adder 109 calculates the differences between first residual vector $Add\_Err\_1^{(d1\_min)}(i)$ (i=0, 1, . . . , R−1), which is received as input from adder 107 and from which an additive factor vector is subtracted, and second code vectors $CODE\_2^{(d2')}(i)$ (i=0, 1, . . . , R−1) received as input from second codebook 108, and outputs these differences to error minimizing section 105 as second residual vectors $Err\_2^{(d2')}(i)$ (i=0, 1, . . . , R−1). Further, among second residual vectors $Err\_2^{(d2')}(i)$ (i=0, 1, . . . , R−1) respectively associated with the values of d2' from d2'=0 to d2'=D1−1, adder 109 outputs minimum second residual vector $Err\_2^{(d2\_min)}(i)$ (i=0, 1, . . . , R−1) found by search in error minimizing section 105, to adder 111.

(Equation 4)

$$Err\_2^{(d2')}(i)=Sca\_Err\_1^{(d1\_min)}(i)-CODE\_2^{(d2')}(i)\ (i=0,1,\ldots,R-1) \quad [4]$$

Here, error minimizing section 105 sequentially designates the values of d2' from d2'=0 to d2'=D2−1 to second codebook 108, and, with respect to all the values of d2' from d2'=0 to d2'=D2−1, calculates squarer errors Err by squaring second residual vectors $Err\_2^{(d2')}(i)$ (i=0, 1, . . . , R−1) received as input from adder 109 according to following equation 5.

(Equation 5)

$$Err=\sum_{i=0}^{R-1}\left(Err\_2^{(d2')}(i)\right)^2 \quad [5]$$

Error minimizing section 105 stores index d2' of the second code vector to minimize square error Err, as second index d2_min.

Third codebook 110 outputs third code vectors $CODE\_3^{(d3')}(i)$ (i=0, 1, . . . , R−1) designated by designation d3' from error minimizing section 105, to adder 111, among third code vectors $CODE\_3^{(d3)}(i)$ (d3=0, 1, . . . , D3−1, i=0, 1, . . . , R−1) forming the codebook. Here, D3 represents the total number of code vectors of the third codebook, and d3 represents the index of a code vector. Also, error minimizing section 105 sequentially designates the values of d3' from d3'=0 to d3'=D3−1, to third codebook 110.

According to following equation 6, adder 111 calculates the differences between second residual vector $Err\_2^{(d2\_min)}(i)$ (i=0, 1, . . . , R−1) received as input from adder 109 and code vectors $CODE\_3^{(d3')}(i)$ (i=0, 1, . . . , R−1) received as input from third codebook 110, and outputs these differences to error minimizing section 105 as third residual vectors $Err\_3^{(d3')}(i)$ (i=0, 1, . . . , R−1).

(Equation 6)

$$Err\_3^{(d3')}(i)=Err\_2^{(d2\_min)}(i)-CODE\_3^{(d3')}(i)\ (i=0,1,\ldots,R-1) \quad [6]$$

Here, error minimizing section 105 sequentially designates the values of d3' from d3'=0 to d3'=D3−1 to third codebook 110, and, with respect to all the values of d3' from d3'=0 to d3'=D3−1, calculates square errors Err by squaring third residual vectors $Err\_3^{(d3')}(i)$ (i=0, 1, . . . , R−1) received as input from adder 111 according to following equation 7.

(Equation 7)

$$Err=\sum_{i=0}^{R-1}\left(Err\_3^{(d3')}(i)\right)^2 \quad [7]$$

Next, error minimizing section 105 stores index d3' of the third code vector to minimize square error Err, as third index d3_min. Further, error minimizing section 105 collectively encodes first index d1_min, second index d2_min and third index d3_min, and outputs the result as encoded data.

Figure 3:
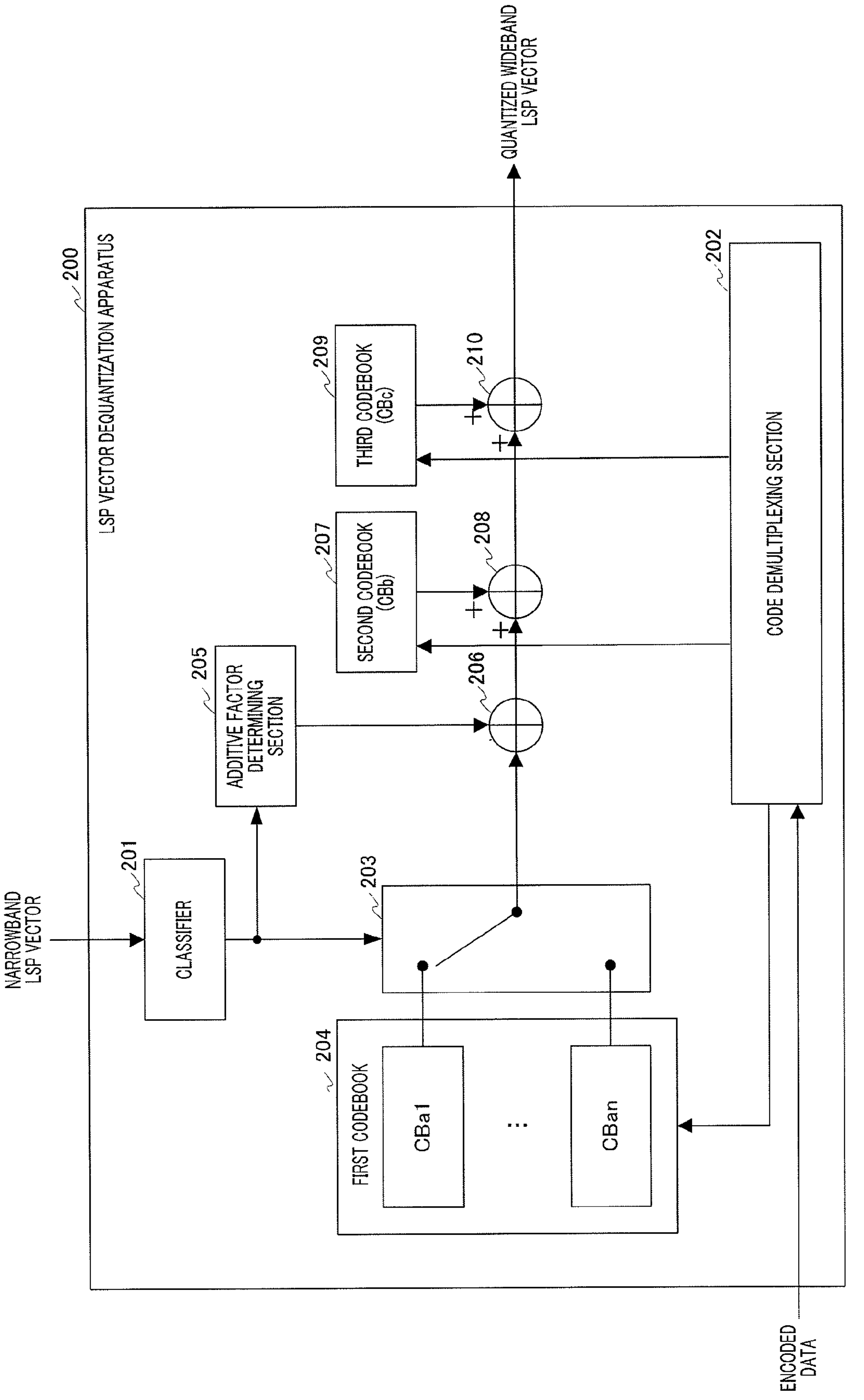
FIG. 3 is a block diagram showing the main components of an LSP vector dequantization apparatus according to Embodiment 1 of the present invention.

FIG. 3 is a block diagram showing the main components of LSP vector dequantization apparatus 200 according to the present embodiment. LSP vector dequantization apparatus 200 decodes encoded data outputted from LSP vector quantization apparatus 100, and generates quantized LSP vectors.

LSP vector dequantization apparatus 200 is provided with classifier 201, code demultiplexing section 202, switch 203, first codebook 204, additive factor determining section 205, adder 206, second codebook (CBb) 207, adder 208, third codebook (CBc) 209 and adder 210. Here, first codebook 204 contains sub-codebooks having the same content as the sub-codebooks (CBa1 to CBan) provided in first codebook 103, and additive factor determining section 205 contains an additive factor codebook having the same content as the additive factor codebook provided in additive factor determining section 106. Also, second codebook 207 contains a codebook having the same contents as the codebook of second codebook 108, and third codebook 209 contains a codebook having the same content as the codebook of third codebook 110.

Classifier 201 stores in advance a classification codebook formed with a plurality items of classification information indicating a plurality of types of narrowband LSP vectors, selects classification information indicating the type of a wideband LSP vector of the vector quantization target from the classification codebook, and outputs the classification information to switch 203 and additive factor determining section 205. To be more specific, classifier 201 has a built-in classification codebook formed with code vectors associated with the types of narrowband LSP vectors, and finds the code vector to minimize the square error with respect to a quantized narrowband LSP vector received as input from a narrowband LSP quantizer (not shown) by searching the classification codebook. Further, classifier 201 uses the index of the code vector found by search, as classification information indicating the type of the LSP vector.

Code demultiplexing section 202 demultiplexes encoded data transmitted from LSP vector quantization apparatus 100, into the first index, the second index and the third index. Further, code demultiplexing section 202 designates the first index to first codebook 204, designates the second index to second codebook 207 and designates the third index to third codebook 209.

Switch 203 selects one sub-codebook (CBam) associated with the classification information received as input from classifier 201, from first codebook 204, and connects the output terminal of the sub-codebook to adder 206.

Among a plurality of first code vectors forming the first codebook, first codebook 204 outputs to switch 203 one first code vector associated with the first index designated by code demultiplexing section 202.

Additive factor determining section 205 selects an additive factor vector associated with the classification information received as input from classifier 201, from an additive factor codebook, and outputs the additive factor vector to adder 206.

Adder 206 adds the additive factor vector received as input from additive factor determining section 205, to the first code vector received as input from switch 203, and outputs the obtained addition result to adder 208.

Second codebook 207 outputs one second code vector associated with the second index designated by code demultiplexing section 202, to adder 208.

Adder 208 adds the addition result received as input from adder 206, to the second code vector received as input from second codebook 207, and outputs the obtained addition result to adder 210.

Third codebook 209 outputs one third code vector associated with the third index designated by code demultiplexing section 202, to adder 210.

Adder 210 adds the addition result received as input from adder 208, to the third code vector received as input from third codebook 209, and outputs the obtained addition result as a quantized wideband LSP vector.

Next, the operations of LSP vector dequantization apparatus 200 will be explained.

Classifier 201 has a built-in classification codebook formed with n code vectors associated with n types of narrowband LSP vectors, and, by searching for code vectors, finds the m-th code vector to minimize the square error with respect to a quantized narrowband LSP vector received as input from a narrowband LSP quantizer (not shown). Classifier 201 outputs m ($1 \leqq m \leqq n$) to switch 203 and additive factor determining section 205 as classification information.

Code demultiplexing section 202 demultiplexes encoded data transmitted from LSP vector quantization apparatus 100, into first index d1_min, second index d2_min and third index d3_min. Further, code demultiplexing section 202 designates first index d1_min to first codebook 204, designates second index d2_min to second codebook 207 and designates third index d3_min to third codebook 209.

From first codebook 204, switch 203 selects sub-codebook CBam associated with classification information m received as input from classifier 201, and connects the output terminal of the sub-codebook to adder 206.

Among first code vectors $CODE\_1^{(d1)}(i)$ (d1=0, 1, . . . , D1−1, i=0, 1, . . . , R−1) forming sub-codebook CBam, first codebook 204 outputs, to switch 203, first code vector $CODE\_1^{(d1\_min)}(i)$ (i=0, 1, . . . , R−1) designated by designation d1_min from code demultiplexing section 202.

Additive factor determining section 205 selects additive factor vector $Add^{(m)}(i)$ (i=0, 1, . . . , R−1) associated with classification information m received as input from classifier 201, from an additive factor codebook, and outputs the additive factor vector to adder 206.

According to following equation 8, adder 206 adds additive factor vector $Add^{(m)}(i)$ (i=0, 1, . . . , R−1) received as input from additive factor determining section 205, to first code vector CODE_1$^{(d1\_min)}$(i) (i=0, 1, . . . , R−1) received as input from first codebook 204, and outputs obtained addition result TMP_1(*i*) (i=0, 1, . . . , R−1) to adder 208.

(Equation 8)

$$TMP\_1(i)=CODE\_1^{(d1\_min)}(i)+Add^{(m)}(i)\quad(i=0, 1, \ldots, R-1)\qquad[8]$$

Second codebook 207 outputs second code vector CODE_2$^{(d2\_min)}$(i) (i=0, 1, . . . , R−1) designated by designation d2_min from code demultiplexing section 202, to adder 208, among second code vectors CODE_2$^{(d2)}$(i) (d2=0, 1, . . . , D2−1, i=0, 1, . . . , R−1) forming the second codebook.

According to following equation 9, adder 208 adds addition result TMP_1(*i*) received as input from adder 206, to second code vector CODE_2$^{(d2\_min)}$(i) (i=0, 1, . . . , R−1) received as input from second codebook 207, and outputs obtained addition result TMP_2(*i*) (i=0, 1, . . . , R−1) to adder 210.

(Equation 9)

$$TMP\_2(i)=TMP\_1(i)+CODE\_2^{(d2\_min)}(i)\quad(i=0, 1, \ldots R-1)\qquad[9]$$

Third codebook 209 outputs third code vector CODE_3$^{(d3\_min)}$(i) (i=0, 1, . . . , R−1) designated by designation d3_min from code demultiplexing section 202, to adder 210, among third code vectors CODE_3$^{(d3)}$(i) (d3=0, 1, . . . , D3−1, i=0, 1, . . . , R−1) forming the third codebook.

According to following equation 10, adder 210 adds addition result TMP_2(*i*) (i=0, 1, . . . , R−1) received as input from adder 208, to third code vector CODE_3$^{(d3\_min)}$(i) (i=0, 1, . . . , R−1) received as input from third codebook 209, and outputs vector Q_LSP(i) (i=0, 1, . . . , R−1) of the addition result as a quantized wideband LSP vector.

(Equation 10)

$$Q\_LSP(i)=TMP\_2(i)+CODE\_3^{(d3\_min)}(i)\quad(i=0, 1, \ldots, R-1)\qquad[10]$$

The first codebook, additive factor codebook, second codebook and third codebook used in LSP vector quantization apparatus 100 and LSP vector dequantization apparatus 200 are produced in advance by learning. The learning method of these codebooks will be explained.

To produce the first codebook provided in first codebook 103 and first codebook 204 by learning, first, a large number (e.g., V) of LSP vectors are prepared from a large amount of speech data for learning. Next, by grouping V LSP vectors per type (n types) and calculating D1 first code vectors CODE_1$^{(d1)}$(i) (d1=0, 1, . . . , D1−1, i=0, 1, . . . , R−1) using the LSP vectors of each group according to learning algorithms such as the LBG (Linde Buzo Gray) algorithm, subcodebooks are generated.

To produce the additive factor codebook provided in additive factor determining section 106 and additive factor determining section 205 by learning, by using the above V LSP vectors and performing first-stage vector quantization by the first codebook produced in the above method, V first residual vectors Err_1$^{(d1\_min)}$(i) (i=0, 1, . . . , R−1) to be outputted from adder 104 are obtained. Next, the V first residual vectors obtained are grouped per type, and the centroid of the first residual vector set belonging to each group is found. Further, by using the vector of each centroid as an additive factor vector for that type, the additive factor codebook is generated.

To produce the second codebook provided in second codebook 108 and second codebook 208 by learning, first-stage vector quantization is performed by the first codebook produced in the above method, using the above V LSP vectors. Next, the additive factor codebook produced in the above method is used to find V first residual vectors Add_Err_1$^{(d1\_min)}$(i) (i=0, 1, . . . , R−1), which are outputted from adder 107 and from which an additive factor vector has been subtracted. Next, using V first residual vectors Add_Err_1$^{(d1\_min)}$(i) (i=0, 1, . . . , R−1) after the subtraction of the additive factor vector, D2 second code vectors CODE_2$^{(d2)}$(i) (d2=0, 1, . . . , D1−1, i=0, 1, . . . , R−1) are calculated according to learning algorithms such as the LBG (Linde Buzo Gray) algorithm, to generate the second codebook.

To produce the third codebook provided in third codebook 110 and third codebook 209 by learning, first-stage vector quantization is performed by the first codebook produced in the above method, using the above V LSP vectors. Next, the additive factor codebook produced in the above method is used to find V first residual vectors Add_Err_1$^{(d1\_min)}$(i) (i=0, 1, . . . , R−1) after the subtraction of an additive factor vector. Further, second-stage vector quantization is performed by the second codebook produced in the above method, to find V second residual vectors Err_2$^{(d2\_min)}$(i) (i=0, 1, . . . , R−1) to be outputted from adder 109. Further, by using V second residual vectors Err_2$^{(d2\_min)}$(i) (i=0, 1, . . . , R−1) and calculating D3 third code vectors CODE_3$^{(d3)}$(i) (d3=0, 1, . . . , D1−1, i=0, 1, . . . , R−1) according to learning algorithms such as the LBG algorithm, the third codebook is generated.

These learning methods are just examples, and it is equally possible to generate codebooks by other methods than the above methods.

Thus, according to the present embodiment, in multi-stage vector quantization where the codebook in the first stage of vector quantization is switched based on the types of narrowband LSP vectors correlated with wideband LSP vectors and where the statistical distribution of vector quantization errors in the first stage (i.e. first residual vectors) varies between types, an additive factor vector associated with the classification result of a narrowband LSP vector is subtracted from first residual vectors. By this means, it is possible to change the average of vectors of the vector quantization targets in the second stage according to the statistical average of vector quantization errors in the first stage, so that it is possible to improve the accuracy of quantization of wideband LSP vectors. Also, upon decoding, it is possible to dequantize vectors using accurately quantized encoded information, so that it is possible to generate decoded signals of high quality.

Figure 4:
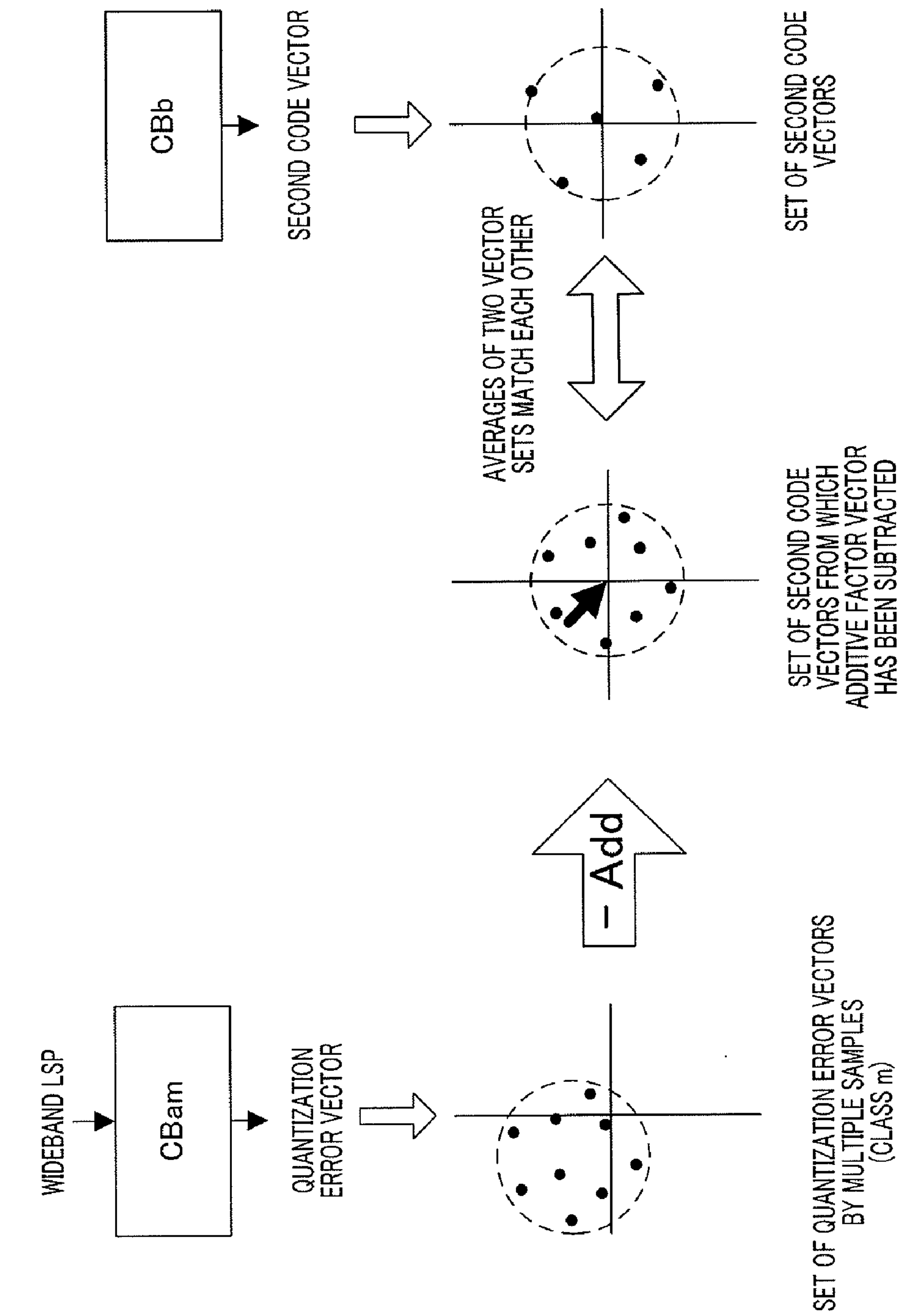
FIG. 4 conceptually illustrates an effect of LSP vector quantization according to Embodiment 1 of the present invention.

FIG. 4 conceptually illustrates an effect of LSP vector quantization according to the present embodiment. In FIG. 4, the arrow with "−ADD" shows processing of subtracting an additive factor vector from quantization error vectors. As shown in FIG. 4, according to the present embodiment, an additive factor vector associated with the narrowband LSP type is subtracted from quantization error vectors acquired by performing vector quantization using first codebook CBam ($m \leqq n$) associated with that type. By this means, it is possible to match the average of a set of quantization error vectors after the subtraction of the additive factor vector, to the average of a set of second code vectors forming common second codebook CBb used in a second stage of vector quantization. Therefore, it is possible to improve the accuracy of quantization in the second stage of vector quantization.

Also, an example case has been described above with the present embodiment where the average of vectors in a second stage of vector quantization is changed according to the statistical average of vector quantization errors in the first stage.

However, the present invention is not limited to this, and it is equally possible to change the average of code vectors used in the second stage of vector quantization, according to the statistical average of vector quantization errors in the first stage. To realize this, as shown in LSP vector quantization apparatus 300 of FIG. 5, adder 307 adds second code vectors provided in a second codebook and an additive factor vector associated with the classification result of a narrowband LSP vector. By this means, as in the present embodiment, it is possible to provide an advantage of improving the accuracy of quantization of wideband LSP vectors.

Figure 5:
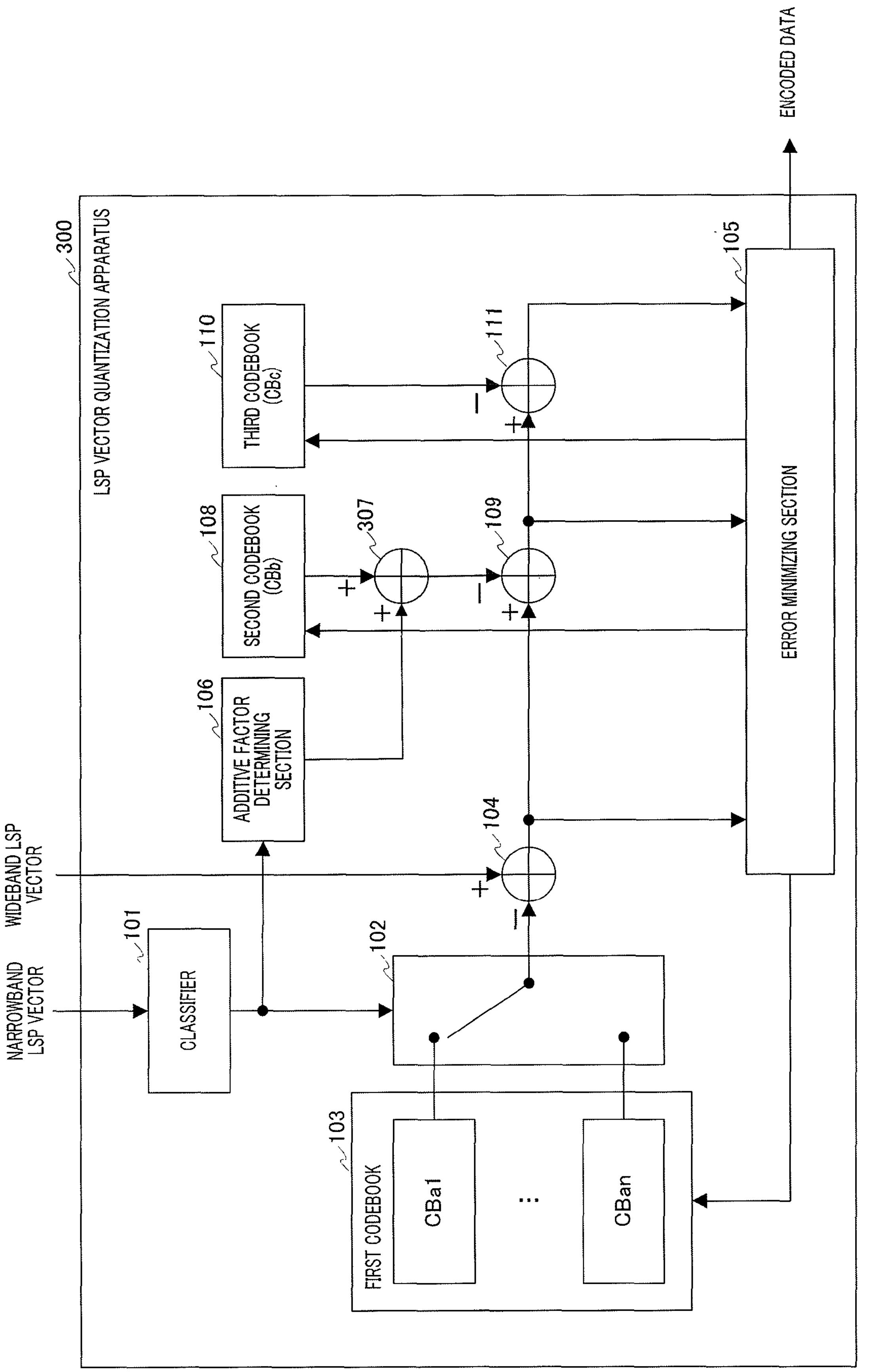
FIG. 5 is a block diagram showing the main components of a variation of an LSP vector quantization apparatus according to Embodiment 1 of the present invention.
Figure 6:
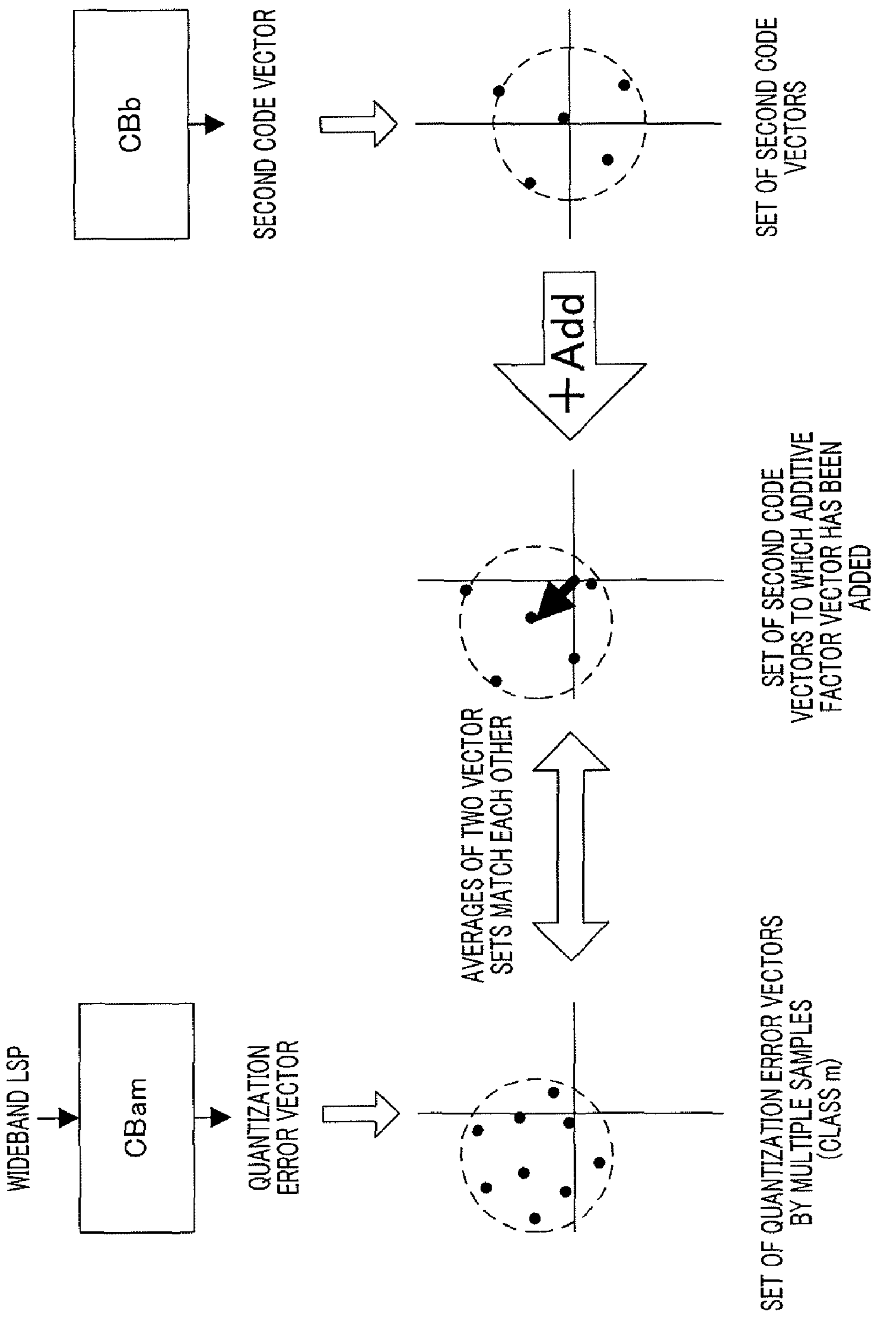
FIG. 6 conceptually illustrates an effect of LSP vector quantization in a variation of an LSP vector quantization apparatus according to Embodiment 1 of the present invention.

FIG. 6 conceptually shows an effect of LSP vector quantization in LSP vector quantization apparatus 300 shown in FIG. 5. In FIG. 6, the arrow with "+Add" shows processing of adding an additive factor vector to second code vectors forming a second codebook. As shown in FIG. 6, using an additive factor vector associated with type m of a narrowband LSP, the present embodiment adds this additive factor vector to the second code vectors forming the second codebook. By this means, it is possible to match the average of a set of second code vectors after the addition of the additive factor vector, to the average of a set of quantization error vectors acquired by performing vector quantization using first codebook CBam ($m \leqq n$). Therefore, it is possible to improve the accuracy of quantization in the second stage of vector quantization.

Also, although an example case has been described above with the present embodiment where additive factor vectors forming the additive factor codebook provided in additive factor determining section 106 and additive factor determining section 205 are associated with the types of narrowband LSP vectors. However, the present invention is not limited to this, and the additive factor vectors forming the additive factor codebook provided in additive factor determining section 106 and additive factor determining section 205 may be associated with the types for classifying the features of speech. In this case, classifier 101 receives parameters representing the features of speech as input speech feature information, instead of narrowband LSP vectors, and outputs the speech feature type associated with the input speech feature information, to switch 102 and additive factor determining section 106 as classification information. For example, like VMR-WB (variable-rate multimode wideband speech codec), when the present invention is applied to a coding apparatus that switches the type of the encoder based on the features of speech including whether speech is voiced or noisy, it is possible to use information about the type of the encoder as is as the amount of features of speech.

Also, although an example case has been described above with the present embodiment where vector quantization of three steps is performed for LSP vectors, the present invention is not limited to this, and is equally applicable to the case of performing vector quantization of two steps or the case of performing vector quantization of four or more steps.

Also, although a case has been described above with the present embodiment where multi-stage vector quantization of three steps is performed for LSP vectors, the present invention is not limited to this, and is equally applicable to the case where vector quantization is performed together with split vector quantization.

Also, although an example case has been described above with the present embodiment where wideband LSP vectors are used as the quantization targets, the quantization target is not limited to this, and it is equally possible to use vectors other than wideband LSP vectors.

Also, although LSP vector dequantization apparatus 200 decodes encoded data outputted from LSP vector quantization apparatus 100 in the present embodiment, the present invention is not limited to this, and it naturally follows that LSP vector dequantization apparatus 200 can receive and decode encoded data as long as this encoded data is in a form that can be decoded by LSP vector dequantization apparatus 200.

Also, the vector quantization apparatus and vector dequantization apparatus according to the present embodiment can be used in a CELP coding apparatus or CELP decoding apparatus for encoding or decoding speech signals, audio signals, and so on. The CELP coding apparatus receives as input LSP's transformed from linear prediction coefficients acquired by performing a linear predictive analysis of an input signal, performs quantization processing of these LSP's and outputs the resulting quantized LSP's to a synthesis filter. For example, if LSP vector quantization apparatus 100 according to the present embodiment is applied to a CELP speech coding apparatus, LSP vector quantization apparatus 100 according to the present embodiment is arranged to an LSP quantization section that outputs an LSP code representing quantized LSP's as encoded data. By this means, it is possible to improve the accuracy of vector quantization and therefore improve the speech quality upon decoding. On the other hand, the CELP decoding apparatus decodes quantized LSP's from the quantized LSP code acquired by demultiplexing received multiplex code data. If the LSP vector dequantization apparatus according to the present invention is applied to the CELP speech decoding apparatus, LSP vector dequantization apparatus 200 may be arranged to an LSP dequantization section that outputs decoded, quantized LSP's to a synthesis filter, thereby providing the same operational effects as above. In the following, CELP coding apparatus 400 and CELP decoding apparatus 450 having LSP vector quantization apparatus 100 and LSP vector dequantization apparatus 200 according to the present embodiment, respectively, will be explained using FIG. 7 and FIG. 8.

Figure 7:
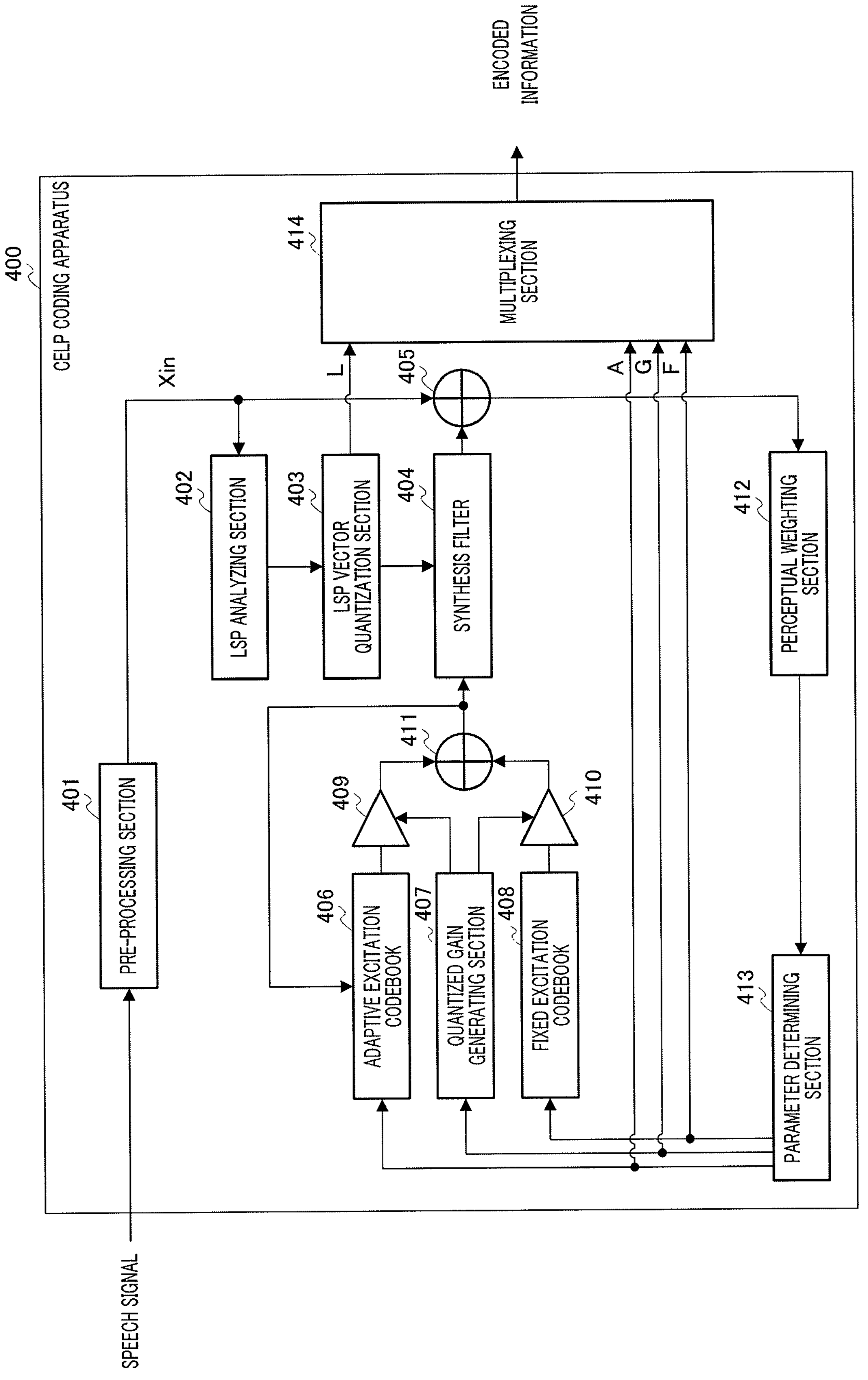
FIG. 7 is a block diagram showing the main components of a CELP coding apparatus having an LSP vector quantization apparatus according to Embodiment 1 of the present invention.

FIG. 7 is a block diagram showing the main components of CELP coding apparatus 400 having LSP vector quantization apparatus 100 according to the present embodiment. CELP coding apparatus 400 divides an input speech or audio signal in units of a plurality of samples, and, using the plurality of samples as one frame, performs coding on a per frame basis.

Pre-processing section 401 performs high-pass filter processing for removing the DC component and performs waveform shaping processing or pre-emphasis processing for improving the performance of subsequent coding processing, on the input speech signal or audio signal, and outputs signal Xin acquired from these processings to LSP analyzing section 402 and adding section 405.

LSP analyzing section 402 performs a linear predictive analysis using signal Xin received as input from pre-processing section 401, transforms the resulting LPC's into an LSP vector and outputs this LSP vector to LSP vector quantization section 403.

LSP vector quantization section 403 performs quantization of the LSP vector received as input from LSP analyzing section 402. Further, LSP vector quantization section 403 outputs the resulting quantized LSP vector to synthesis filter 404 as filter coefficients, and outputs quantized LSP code (L) to multiplexing section 414. Here, LSP vector quantization apparatus 100 according to the present embodiment is adopted as LSP vector quantization section 403. That is, the specific configuration and operations of LSP vector quantization section 403 are the same as LSP vector quantization apparatus 100. In this case, a wideband LSP vector received as input in LSP vector quantization apparatus 100 corresponds to an LSP vector received as input in LSP vector quantization section 403. Also, encoded data to be outputted from LSP vector quantization apparatus 100 corresponds to a quantized LSP code (L) to be outputted from LSP vector quantization section 403. Filter coefficients received as input in synthesis filter 404 represent the quantized LSP vector acquired by performing dequantization using the quantized LSP code (L) in LSP vector quantization section 403. Also, a narrowband LSP vector received as input in LSP vector quantization apparatus 100 is received as input from, for example, outside CELP coding apparatus 400. For example, if this LSP vector quantization apparatus 100 is applied to a scalable coding apparatus (not shown) having a wideband CELP coding section (corresponding to CELP coding apparatus 400) and narrowband CELP coding section, a narrowband LSP vector to be outputted from the narrowband CELP coding section is received as input in LSP vector quantization apparatus 100.

Synthesis filter 404 performs synthesis processing of an excitation received as input from adder 411 (described later) using filter coefficients based on the quantized LSP vector received as input from LSP vector quantization section 403, and outputs a generated synthesis signal to adder 405.

Adder 405 calculates an error signal by inverting the polarity of the synthesis signal received as input from synthesis filter 404 and adding the resulting synthesis signal to signal Xin received as input from pre-processing section 401, and outputs the error signal to perceptual weighting section 412.

Adaptive excitation codebook 406 stores excitations received in the past from adder 411 in a buffer, and, from this buffer, extracts one frame of samples from the extraction position specified by an adaptive excitation lag code (A) received as input from parameter determining section 413, and outputs the result to multiplier 409 as an adaptive excitation vector. Here, adaptive excitation codebook 406 updates content of the buffer every time an excitation is received as input from adder 411.

Quantized gain generating section 407 determines a quantized adaptive excitation gain and quantized fixed excitation gain by a quantized excitation gain code (G) received as input from parameter determining section 413, and outputs these gains to multiplier 409 and multiplier 410, respectively.

Fixed excitation codebook 408 outputs a vector having a shape specified by a fixed excitation vector code (F) received as input from parameter determining section 413, to multiplier 410 as a fixed excitation vector.

Multiplier 409 multiplies the adaptive excitation vector received as input from adaptive excitation codebook 406 by the quantized adaptive excitation gain received as input from quantized gain generating section 407, and outputs the result to adder 411.

Multiplier 410 multiplies the fixed excitation vector received as input from fixed excitation codebook 408 by the quantized fixed excitation gain received as input from quantized gain generating section 407, and outputs the result to adder 411.

Adder 411 adds the adaptive excitation vector multiplied by the gain received as input from multiplier 409 and the fixed excitation vector multiplied by the gain received as input from multiplier 410, and outputs the addition result to synthesis filter 404 and adaptive excitation codebook 406 as an excitation. Here, the excitation received as input in adaptive excitation codebook 406 is stored in the buffer of adaptive excitation codebook 406.

Perceptual weighting section 412 performs perceptual weighting processing of the error signal received as input from adder 405, and outputs the result to parameter determining section 413 as coding distortion.

Parameter determining section 413 selects the adaptive excitation lag to minimize the coding distortion received as input from perceptual weighting section 412, from adaptive excitation codebook 406, and outputs an adaptive excitation lag code (A) representing the selection result to adaptive excitation codebook 406 and multiplexing section 414. Here, an adaptive excitation lag is the parameter representing the position for extracting an adaptive excitation vector. Also, parameter determining section 413 selects the fixed excitation vector to minimize the coding distortion outputted from perceptual weighting section 412, from fixed excitation codebook 408, and outputs a fixed excitation vector code (F) representing the selection result to fixed excitation codebook 408 and multiplexing section 414. Further, parameter determining section 413 selects the quantized adaptive excitation gain and quantized fixed excitation gain to minimize the coding distortion outputted from perceptual weighting section 412, from quantized gain generating section 407, and outputs a quantized excitation gain code (G) representing the selection result to quantized gain generating section 407 and multiplexing section 414.

Multiplexing section 414 multiplexes the quantized LSP code (L) received as input from LSP vector quantization section 403, the adaptive excitation lag code (A), fixed excitation vector code (F) and quantized excitation gain code (G) received as input from parameter determining section 413, and outputs encoded information.

Figure 8:
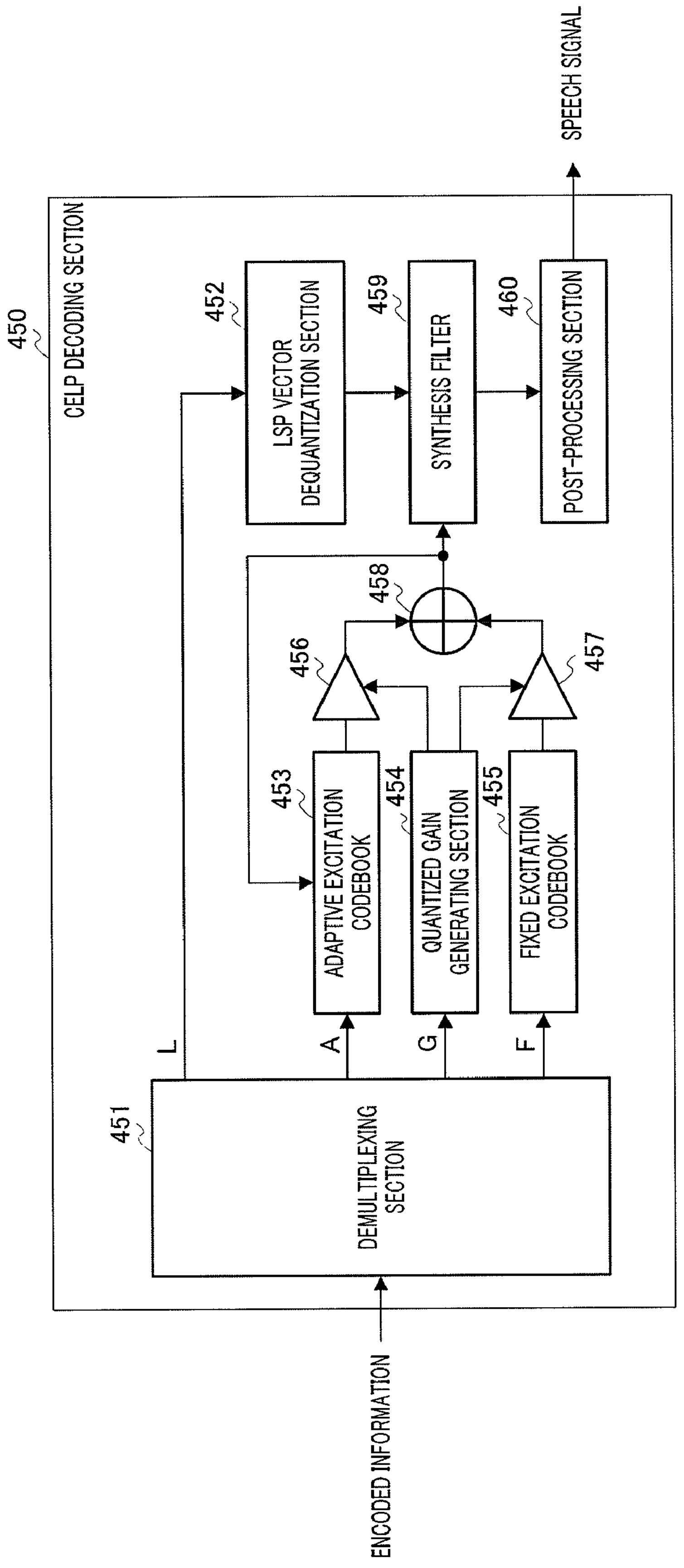
FIG. 8 is a block diagram showing the main components of a CELP decoding apparatus having an LSP vector dequantization apparatus according to Embodiment 1 of the present invention.

FIG. 8 is a block diagram showing the main components of CELP decoding apparatus 450 having LSP vector dequantization apparatus 200 according to the present embodiment.

In FIG. 8, demultiplexing section 451 performs demultiplexing processing of encoded information transmitted from CELP coding apparatus 400, into the quantized LSP code (L), adaptive excitation lag code (A), quantized excitation gain code (G) and fixed excitation vector code (F). Demultiplexing section 451 outputs the quantized LSP code (L) to LSP vector dequantization section 452, the adaptive excitation lag code (A) to adaptive excitation codebook 453, the quantized excitation gain code (G) to quantized gain generating section 454 and the fixed excitation vector code (F) to fixed excitation codebook 455.

LSP vector dequantization section 452 decodes a quantized LSP vector from the quantized LSP code (L) received as input from demultiplexing section 451, and outputs the quantized LSP vector to synthesis filter 459 as filter coefficients. Here, LSP vector dequantization apparatus 200 according to the present embodiment is adopted as LSP vector dequantization section 452. That is, the specific configuration and operations of LSP vector dequantization section 452 are the same as LSP vector dequantization apparatus 200. In this case, encoded data received as input in LSP vector dequantization apparatus 200 corresponds to the quantized LSP code (L) received as input in LSP vector dequantization section 452. Also, a quantized wideband LSP vector to be outputted from LSP vector dequantization apparatus 200 corresponds to the quantized LSP vector to be outputted from LSP vector dequantization section 452. Also, a narrowband LSP vector received as input in LSP vector dequantization apparatus 200 is received as input from, for example, outside CELP decoding apparatus 450. For example, if this LSP vector dequantization apparatus 200 is applied to a scalable decoding apparatus (not shown) having a wideband CELP decoding section (corresponding to CELP decoding apparatus 450) and narrowband CELP decoding section, a narrowband LSP vector to be outputted from the narrowband CELP decoding section is received as input in LSP vector dequantization apparatus 200.

Adaptive excitation codebook 453 extracts one frame of samples from the extraction position specified by the adaptive excitation lag code (A) received as input from demultiplexing section 451, from a buffer, and outputs the extracted vector to multiplier 456 as an adaptive excitation vector. Here, adaptive excitation codebook 453 updates content of the buffer every time an excitation is received as input from adder 458.

Quantized gain generating section 454 decodes a quantized adaptive excitation gain and quantized fixed excitation gain indicated by the quantized excitation gain code (G) received as input from demultiplexing section 451, outputs the quantized adaptive excitation gain to multiplier 456 and outputs the quantized fixed excitation gain to multiplier 457.

Fixed excitation codebook 455 generates a fixed excitation vector indicated by the fixed excitation vector code (F) received as input from demultiplexing section 451, and outputs the fixed excitation vector to multiplier 457.

Multiplier 456 multiplies the adaptive excitation vector received as input from adaptive excitation codebook 453 by the quantized adaptive excitation gain received as input from quantized gain generating section 454, and outputs the result to adder 458.

Multiplier 457 multiplies the fixed excitation vector received as input from fixed excitation codebook 455 by the quantized fixed excitation gain received as input from quantized gain generating section 454, and outputs the result to adder 458.

Adder 458 generates an excitation by adding the adaptive excitation vector multiplied by the gain received as input from multiplier 456 and the fixed excitation vector multiplied by the gain received as input from multiplier 457, and outputs the generated excitation to synthesis filter 459 and adaptive excitation codebook 453. Here, the excitation received as input in adaptive excitation codebook 453 is stored in the buffer of adaptive excitation codebook 453.

Synthesis filter 459 performs synthesis processing using the excitation received as input from adder 458 and the filter coefficients decoded in LSP vector dequantization section 452, and outputs a generated synthesis signal to post-processing section 460.

Post-processing section 460 applies processing for improving the subjective quality of speech such as formant emphasis and pitch emphasis and processing for improving the subjective quality of stationary noise, to the synthesis signal received as input from synthesis filter 459, and outputs the resulting speech signal or audio signal.

Thus, according to the CELP coding apparatus and CELP decoding apparatus of the present embodiment, by using the vector quantization apparatus and vector dequantization apparatus of the present embodiment, it is possible to improve the accuracy of vector quantization upon coding, so that it is possible to improve speech quality upon decoding.

Also, although CELP decoding apparatus 450 decodes encoded data outputted from CELP coding apparatus 400 in the present embodiment, the present invention is not limited to this, and it naturally follows that CELP decoding apparatus 450 can receive and decode encoded data as long as this encoded data is in a form that can be decoded by CELP decoding apparatus 450.

Embodiment 2

Figure 9:
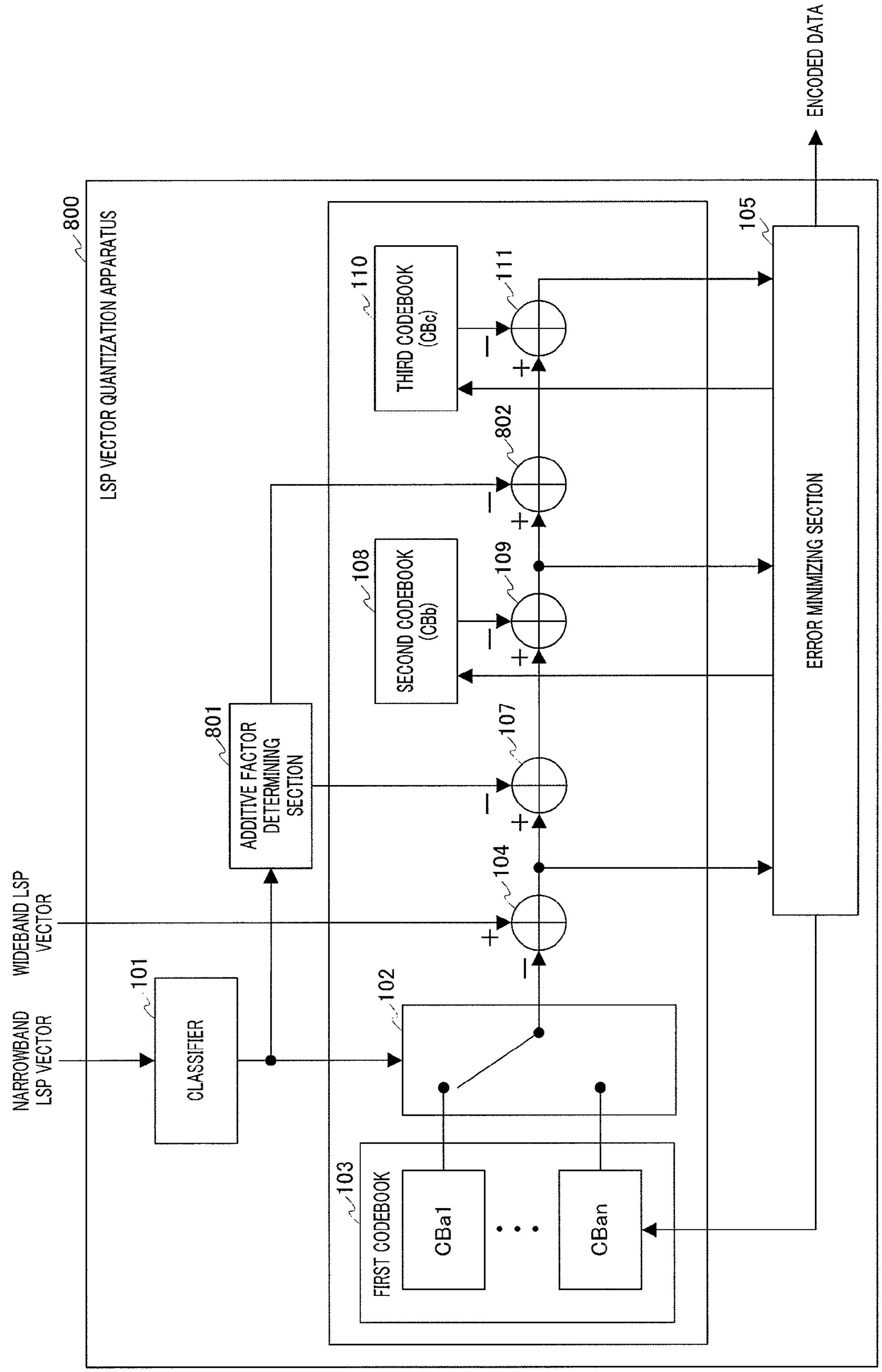
FIG. 9 is a block diagram showing the main components of an LSP vector quantization apparatus according to Embodiment 2 of the present invention.

FIG. 9 is a block diagram showing the main components of LSP vector quantization apparatus 800 according to Embodiment 2 of the present invention. Also, LSP vector quantization apparatus 800 has the same basic configuration as LSP vector quantization apparatus 100 (see FIG. 2) shown in Embodiment 1, and therefore the same components will be assigned the same reference numerals and their explanation will be omitted.

LSP vector quantization apparatus 800 is provided with classifier 101, switch 102, first codebook 103, adder 104, error minimizing section 105, adder 107, second codebook 108, adder 109, third codebook 110, adder 111, additive factor determining section 801 and adder 802.

Here, in a case where an input LSP vector is subjected to vector quantization by multi-stage vector quantization of three steps, the codebook to use in the first stage of vector quantization is determined using classification information indicating the narrowband LSP vector type, the first quantization error vector is found by performing first-stage vector quantization, and furthermore, an additive factor vector associated with the classification information is determined. Here, the additive factor vector is formed with an additive factor vector added to the first residual vector outputted from adder 104 (i.e. first additive factor vector) and an additive factor vector added to a second residual vector outputted from adder 109 (i.e. second additive factor vector). Also, additive factor determining section 801 outputs the first additive factor vector to adder 107 and outputs the second additive factor vector to adder 802. Thus, by preparing in advance the additive factor vector suitable for each stage in multi-stage vector quantization, it is possible to adaptively adjust a codebook in more detail.

Additive factor determining section 801 stores in advance an additive factor codebook, which is formed with n types of first additive factor vectors and n types of second additive factor vectors associated with the types (n types) of narrowband LSP vectors. Also, additive factor determining section 801 selects the first additive factor vector and second additive factor vector associated with classification information received as input from classifier 101, from the additive factor codebook, and outputs the selected first additive factor vector to adder 107 and the selected second additive factor vector to adder 802.

Adder 107 finds the difference between the first residual vector received as input from adder 104 and the first additive factor vector received as input from additive factor determining section 801, and outputs the result to adder 109.

Adder 109 finds the differences between the first residual vector, which is received as input from adder 107 and from which the first additive factor vector is subtracted, and second code vectors received as input from second codebook 108, and outputs these differences to adder 802 and error minimizing section 105 as second residual vectors.

Adder 802 finds the difference between a second residual vector received as input from adder 109 and the second additive factor vector received as input from additive factor determining section 801, and outputs a vector of this difference to adder 111.

Adder 111 finds the differences between the second residual vector, which is received as input from adder 802 and from which the second additive factor vector is subtracted, and third code vectors received as input from third codebook 110, and outputs vectors of these differences to error minimizing section 105 as third residual vectors.

Next, the operations of LSP vector quantization apparatus 800 will be explained.

An example case will be explained where the order of an LSP vector of the quantization target is R. An LSP vector will be expressed as LSP(i) (i=0, 1, . . . , R−1).

Additive factor determining section 801 selects first additive factor vector $Add1^{(m)}(i)$ (i=0, 1, . . . , R−1) and second additive factor vector $Add2^{(m)}(i)$ (i=0, 1, . . . , R−1) associated with classification information m, from an additive factor codebook, and outputs the first additive factor vector to adder 107 and the second additive factor vector to adder 802.

According to following equation 11, adder 107 subtracts first additive factor vector Add1$^{(m)}$(i) (i=0, 1, . . . , R−1) received as input from additive factor determining section 801, from first residual vector Err_1$^{(d1\_min)}$(i) (i=0, 1, . . . , R−1) to minimize square error Err in the first stage of vector quantization, and outputs the result to adder 109.

(Equation 11)

$$Add\_Err\_1^{(d1\_min)}(i)=Err\_1^{(d1\_min)}(i)-Add1^{(m)}(i)\quad (i=0,1,\ldots,R-1) \qquad [11]$$

According to following equation 12, adder 109 finds the differences between first residual vector Add_Err_1$^{(d1\_min)}$(i) (i=0, 1, . . . , R−1), which is received as input from adder 107 and from which the first additive factor vector has been subtracted, and second code vectors CODE_2$^{(d2)}$(i) (i=0, 1, . . . , R−1) received as input from second codebook 108, and outputs vectors of these differences to adder 802 and error minimizing section 105 as second residual vectors Err_2$^{(d2)}$(i) (i=0, 1, . . . , R−1).

(Equation 12)

$$Err\_2^{(d2')}(i)=Add\_Err\_1^{(d1\_min)}(i)-CODE\_2^{(d2')}(i)\quad (i=0,1,\ldots,R-1) \qquad [12]$$

According to following equation 13, adder 802 subtracts second additive factor vector Add2$^{(m)}$(i) (i=0, 1, . . . , R−1) received as input from additive factor determining section 801, from second residual vector Err_2$^{(d2\_min)}$(i) (i=0, 1, . . . , R−1) to minimize square error Err in a second stage of vector quantization, and outputs the result to adder 111.

(Equation 13)

$$Add\_Err\_2^{(d2\_min)}(i)=Err\_2^{(d2\_min)}(i)-Add2^{(m)}(i)\quad (i=0,1,\ldots,R-1) \qquad [13]$$

According to following equation 14, adder 111 finds the differences between second residual vector Add_Err_2$^{(d2\_min)}$(i) (i=0, 1, . . . , R−1), which is received as input from adder 802 and from which the second additive factor vector has been subtracted, and third code vectors CODE_3$^{(d3)}$(i) (i=0, 1, . . . , R−1) received as input from third codebook 110, and outputs vectors of these differences to error minimizing section 105 as third residual vectors Err_3$^{(d3)}$(i) (i=0, 1, . . . , R−1).

(Equation 14)

$$Err\_3^{(d3')}(i)=Add\_Err\_2^{(d2\_min)}(i)-CODE\_3^{(d3')}(i)\quad (i=0,1,\ldots,R-1) \qquad [14]$$

Figure 10:
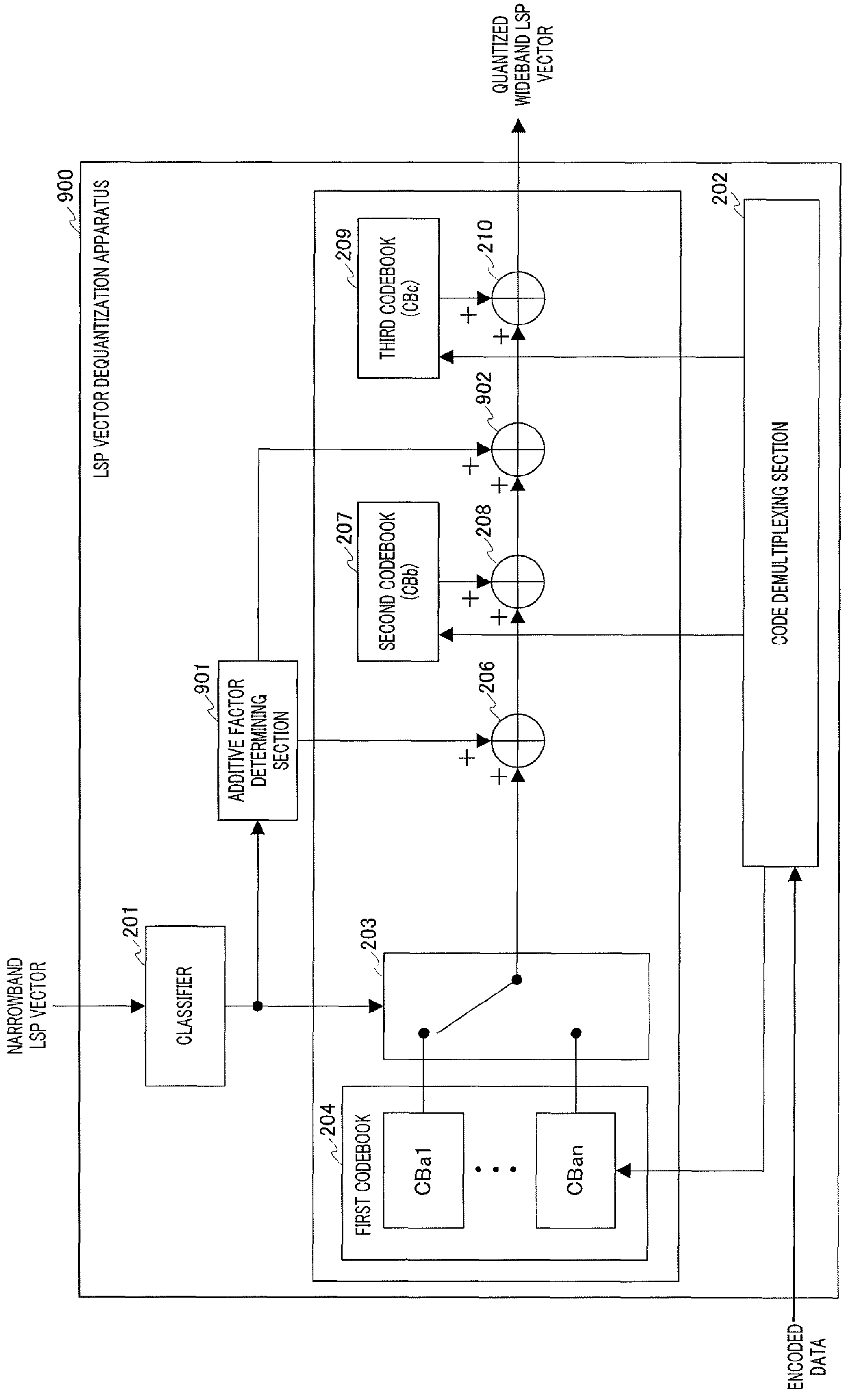
FIG. 10 is a block diagram showing the main components of an LSP vector dequantization apparatus according to Embodiment 2 of the present invention.

FIG. 10 is a block diagram showing the main components of LSP vector dequantization apparatus 900 according to Embodiment 2 of the present invention. Also, LSP vector dequantization apparatus 900 has the same basic configuration as LSP vector dequantization apparatus 200 (see FIG. 3) shown in Embodiment 1, and the same components will be assigned the same reference numerals and their explanation will be omitted.

Here, an example case will be explained where LSP vector dequantization apparatus 900 decodes encoded data outputted from LSP vector quantization apparatus 800 to generate a quantized LSP vector.

LSP vector dequantization apparatus 900 is provided with classifier 201, code demultiplexing section 202, switch 203, first codebook 204, adder 206, second codebook 207, adder 208, third codebook 209, adder 210, additive factor determining section 901 and adder 902.

Additive factor determining section 901 stores in advance an additive factor codebook formed with n types of first additive factor vectors and n types of second additive factor vectors, selects the first additive factor vector and second additive factor vector associated with classification information received as input from classifier 201, from the additive factor codebook, and outputs the selected first additive factor vector to adder 206 and the selected second additive factor vector to adder 902.

Adder 206 adds the first additive factor vector received as input from additive factor determining section 901 and the first code vector received as input from first codebook 204 via switch 203, and outputs the added vector to adder 208.

Adder 208 adds the first code vector, which is received as input from adder 206 and to which the first additive factor vector has been added, and a second code vector received as input from second codebook 207, and outputs the added vector to adder 902.

Adder 902 adds the second additive factor vector received as input from additive factor determining section 901 and the vector received as input from adder 208, and outputs the added vector to adder 210.

Adder 210 adds the vector received as input from adder 902 and a third code vector received as input from third codebook 209, and outputs the added vector as a quantized wideband LSP vector.

Next, the operations of LSP vector dequantization apparatus 900 will be explained.

Additive factor determining section 901 selects first additive factor vector Add1$^{(m)}$(i) (i=0, 1, . . . , R−1) and second additive factor vector Add2$^{(m)}$(i) (i=0, 1, . . . , R−1) associated with classification information m, from the additive factor codebook, and outputs the first additive factor vector to adder 206 and the second additive factor vector to adder 902.

According to following equation 15, adder 206 adds first code vector CODE_1$^{(d1\_min)}$(i) (i=0, 1, . . . , R−1) received as input from first codebook 204 via switch 203 and first additive factor vector Add1$^{(m)}$(i) (i=0, 1, . . . , R−1) received as input from additive factor determining section 901, and outputs the added vector to adder 208.

(Equation 15)

$$TMP\_1(i)=CODE\_1^{(d1\_min)}(i)+Add1^{(m)}(i)\quad (i=0,1,\ldots,R-1) \qquad [15]$$

According to following equation 16, adder 208 adds vector TMP_1($i$) (i=0, 1, . . . , R−1) received as input from adder 206 and second code vector CODE_2$^{(d2\_min)}$(i) (i=0, 1, . . . , R−1) received as input from second codebook 207, and outputs the added vector to adder 902.

(Equation 16)

$$TMP\_2(i)=TMP\_1(i)+CODE\_2^{(d2\_min)}(i)\quad (i=0,1,\ldots,R-1) \qquad [16]$$

According to following equation 17, adder 902 adds vector TMP_2($i$) (i=0, 1, . . . , R−1) received as input from adder 208 and second additive factor vector Add2$^{(m)}$(i) (i=0, 1, . . . , R−1) received as input from additive factor determining section 901, and outputs the added vector to adder 210.

(Equation 17)

$$TMP\_3(i)=TMP\_2(i)+Add2^{(m)}(i)\quad (i=0,1,\ldots,R-1) \qquad [17]$$

According to following equation 18, adder 210 adds vector TMP_3($i$) (i=0, 1, . . . , R−1) received as input from adder 902 and third code vector $CODE\_3^{(d3\_min)}(i)$ (i=0, 1, . . . , R−1) received as input from third codebook 209, and outputs the added vector as a quantized wideband LSP vector.

(Equation 18)

$$Q\_LSP(i)=TMP\_3(i)+CODE\_3^{(d3\_min)}(i) \quad (i=0, 1, \ldots, R-1) \qquad [18]$$

Thus, according to the present embodiment, in addition to the effect of above Embodiment 1, it is possible to further improve the accuracy of quantization compared to Embodiment 1 by determining an additive factor vector every quantization. Also, upon decoding, it is possible to dequantize vectors using accurately quantized encoded information, so that it is possible to generate decoded signals of higher quality.

Also, although LSP vector dequantization apparatus 900 decodes encoded data outputted from LSP vector quantization apparatus 800 in the present embodiment, the present invention is not limited to this, and it naturally follows that LSP vector dequantization apparatus 900 can receive and decode encoded data as long as this encoded data is in a form that can be decoded in LSP vector dequantization apparatus 900.

Further, as in Embodiment 1, it naturally follows that the LSP vector quantization apparatus and LSP vector dequantization apparatus according to the present embodiment can be used in a CELP coding apparatus or CELP decoding apparatus for encoding or decoding speech signals, audio signals, and so on.

Embodiment 3

Figure 11:
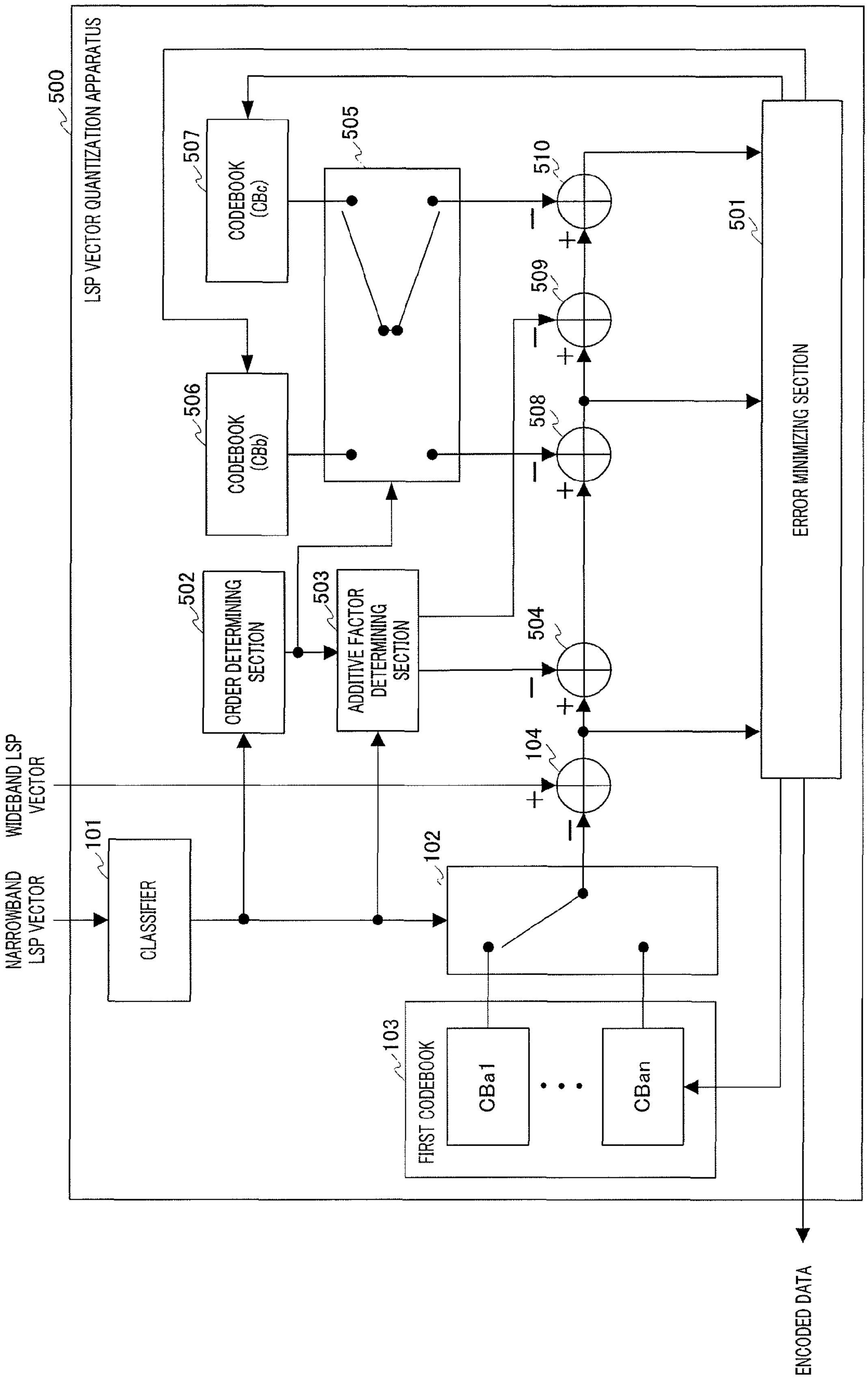
FIG. 11 is a block diagram showing the main components of an LSP vector quantization apparatus according to Embodiment 3 of the present invention.

FIG. 11 is a block diagram showing the main components of LSP vector quantization apparatus 500 according to Embodiment 3 of the present invention. Here, LSP vector quantization apparatus 500 has the same basic configuration as LSP vector quantization apparatus 100 (see FIG. 2) shown in Embodiment 1, and therefore the same components will be assigned the same reference numerals and their explanation will be omitted.

LSP vector quantization apparatus 500 is provided with classifier 101, switch 102, first codebook 103, adder 104, error minimizing section 501, order determining section 502, additive factor determining section 503, adder 504, switch 505, codebook 506, codebook 507, adder 508, adder 509 and adder 510.

Here, in a case where an input LSP vector is subjected to vector quantization by multi-stage vector quantization of three steps, the codebook to use in the first stage of vector quantization is determined using classification information indicating the narrowband LSP vector type, the first quantization error vector (i.e. first residual vector) is found by performing first-stage vector quantization, and furthermore, an additive factor vector associated with the classification information is determined. Here, the additive factor vector is formed with an additive factor vector added to the first residual vector outputted from adder 104 (i.e. first additive factor vector) and an additive factor vector added to a second residual vector outputted from adder 508 (i.e. second additive factor vector). Next, order determining section 502 determines the order of use of codebooks to use in second and later stages of vector quantization, depending on classification information, and rearranges the codebooks according to the determined order of use. Also, additive factor determining section 503 switches the order to output the first additive factor vector and the second additive factor vector, according to the order of use of codebooks determined in order determining section 502. Thus, by switching the order of use of codebooks to use in second and later stages of vector quantization, it is possible to use codebooks suitable for statistical distribution of quantization errors in an earlier stage of multi-stage vector quantization in which a suitable codebook is determined every stage.

Error minimizing section 501 uses the results of squaring the first residual vectors received as input from adder 104, as square errors between a wideband LSP vector and the first code vectors, and finds the first code vector to minimize the square error by searching the first codebook. Similarly, error minimizing section 501 uses the results of squaring second residual vectors received as input from adder 508, as square errors between the first residual vector and second code vectors, and finds the code vector to minimize the square error by searching a second codebook. Here, the second codebook refers to the codebook determined as the "codebook to use in a second stage of vector quantization" in order determining section 502 (described later), between codebook 506 and codebook 507. Also, a plurality of code vectors forming the second codebook are used as a plurality of second code vectors. Next, error minimizing section 501 uses the results of squaring third residual vectors received as input from adder 510, as square errors between the third residual vector and third code vectors, and finds the code vector to minimize the square error by searching a third codebook. Here, the third codebook refers to the codebook determined as the "codebook to use in a third stage of vector quantization" in order determining section 502 (described later), between codebook 506 and codebook 507. Also, a plurality of code vectors forming the third codebook are used as a plurality of third code vectors. Further, error minimizing section 501 collectively encodes the indices assigned to three code vectors acquired by search, and outputs the result as encoded data.

Order determining section 502 stores in advance an order information codebook comprised of n types of order information associated with the types (n types) of narrowband LSP vectors. Also, order determining section 502 selects order information associated with classification information received as input from classifier 101, from the order information codebook, and outputs the selected order information to additive factor determining section 503 and switch 505. Here, order information refers to information indicating the order of use of codebooks to use in second and later stages of vector quantization. For example, order information is expressed as "0" to use codebook 506 in a second stage of vector quantization and codebook 507 in a third stage of vector quantization, or order information is expressed as "1" to use codebook 507 in the second stage of vector quantization and codebook 506 in the third stage of vector quantization. In this case, by outputting "0" or "1" as order information, order determining section 502 can designate the order of codebooks to use in second and later stages of vector quantization, to additive factor determining section 503 and switch 505.

Additive factor determining section 503 stores in advance an additive factor codebook formed with n types of additive factor vectors (for codebook 506) and n types of additive factor vectors (for codebook 507) associated with the types (n types) of narrowband LSP vectors. Also, additive factor determining section 503 selects an additive factor vector (for codebook 506) and additive factor vector (for codebook 507) associated with classification information received as input from classifier 101, from the additive factor codebook. Next, according to order information received as input from order determining section 502, out of the plurality of additive factor vectors selected, additive factor determining section 503 outputs an additive factor vector to use in a second stage of vector quantization to adder 504, as the first additive factor vector, and outputs an additive factor vector to use in a third stage of vector quantization to adder 509, as a second residual factor vector. In other words, according to the order of use of codebooks (i.e. codebooks 506 and 507) to use in a second stage and third stage of vector quantization, additive factor determining section 503 outputs additive factor vectors associated with these codebooks to adder 504 and adder 509, respectively.

Adder 504 finds the difference between the first residual vector received as input from adder 104 and the first additive factor vector received as input from additive factor determining section 503, and outputs a vector of this difference to adder 508.

According to order information received as input from order determining section 502, switch 505 selects the codebook to use in a second stage of vector quantization (i.e. second codebook) and the codebook to use in a third stage of vector quantization (i.e. third codebook), from codebook 506 and codebook 507, and connects the output terminal of each selected codebook to one of adder 508 and adder 510.

Codebook 506 outputs code vectors designated by designation from error minimizing section 501, to switch 505.

Codebook 507 outputs code vectors designated by designation from error minimizing section 501, to switch 505.

Adder 508 finds the differences between the first residual vector, which is received as input from adder 504 and from which the first additive factor vector is subtracted, and second code vectors received as input from switch 505, and outputs the resulting differences to adder 509 and error minimizing section 501 as second residual vectors.

Adder 509 finds the difference between the second residual vector received as input from adder 508 and a second additive factor vector received as input from additive factor determining section 503, and outputs a vector of this difference to adder 510.

Adder 510 finds the differences between the second residual vector, which is received as input from adder 509 and from which the second additive factor vector is subtracted, and third code vectors received as input from switch 505, and outputs vectors of these differences to error minimizing section 501 as third residual vectors.

Next, the operations performed by LSP vector quantization apparatus 500 will be explained, using an example case where the order of a wideband LSP vector of the quantization target is R. Also, in the following explanation, a wideband LSP vector will be expressed by "LSP(i) (i=0, 1, . . . , R−1)."

Error minimizing section 501 sequentially designates the values of d1' from d1'=0 to d1'=D1−1 to first codebook 103, and, with respect to the values of d1' from d1'=0 to d1'=D1−1, calculates square errors Err by squaring first residual vectors $\mathrm{Err\_1}^{(d1')}(i)$ (i=0, 1, . . . , R−1) received as input from adder 104 according to following equation 19.

(Equation 19)

$$Err=\sum_{i=0}^{R-1}\left(\mathrm{Err\_1}^{(d1')}(i)\right)^2 \qquad [19]$$

Error minimizing section 501 stores index d1' of the first code vector to minimize square error Err, as first index d1_min.

Order determining section 502 selects order information $\mathrm{Ord}^{(m)}$ associated with classification information m from the order information codebook, and outputs the order information to additive factor determining section 503 and switch 505. Here, if the value of order information Ore') is "0," codebook 506 is used in a second stage of vector quantization and codebook 507 is used in a third stage of vector quantization. Also, if the value of order information $\mathrm{Ord}^{(m)}$ is "1," codebook 507 is used in the second stage of vector quantization and codebook 506 is used in the third stage of vector quantization.

Additive factor determining section 503 selects additive factor vector $\mathrm{Add1}^{(m)}(i)$ (i=0, 1, . . . , R−1) (for codebook 506) and additive factor vector $\mathrm{Add2}^{(m)}(i)$ (i=0, 1, . . . , R−1) (for codebook 507) associated with classification information m, from the additive factor codebook. Further, if the value of order information $\mathrm{Ord}^{(m)}$ received as input from order determining section 502 is "0," additive factor determining section 503 outputs additive factor vector $\mathrm{Add1}^{(m)}(i)$ to adder 504 as the first additive factor vector, and outputs additive factor vector $\mathrm{Add2}^{(m)}(i)$ to adder 509 as a second additive factor vector. By contrast, if the value of order information $\mathrm{Ord}^{(m)}$ received as input from order determining section 502 is "1," additive factor determining section 503 outputs additive factor vector $\mathrm{Add2}^{(m)}(i)$ to adder 504 as the first additive factor vector, and outputs additive factor vector $\mathrm{Add1}^{(m)}(i)$ to adder 509 as a second additive factor vector.

According to following equation 20, adder 504 subtracts first additive factor vector $\mathrm{Add}^{(m)}(i)$ (i=0, 1, . . . , R−1) received as input from additive factor determining section 503, from first residual vector $\mathrm{Err\_1}^{(d1\_min)}(i)$ (i=0, 1, . . . , R−1) received as input from adder 104, and outputs resulting $\mathrm{Add\_Err\_1}^{(d1\_min)}(i)$ to adder 508. Here, first additive factor vector $\mathrm{Add}^{(m)}(i)$ (i=0, 1, . . . , R−1) represents one of additive factor vector $\mathrm{Add1}^{(m)}(i)$ (i=0, 1, . . . , R−1) and additive factor vector $\mathrm{Add2}^{(m)}(i)$ (i=0, 1, . . . , R−1).

(Equation 20)

$$\mathrm{Add\_Err\_1}^{(d1\_min)}(i)=\mathrm{Err\_1}^{(d1\_min)}(i)-\mathrm{Add}^{(m)}(i)\quad (i=0,1,\ldots,R-1) \qquad [20]$$

Switch 505 connects the output terminals of codebooks to the input terminals of adders, according to order information $\mathrm{Ord}^{(m)}$ received as input from order determining section 502. For example, if the value of order information $\mathrm{Ord}^{(m)}$ is "0," switch 505 connects the output terminal of codebook 506 to the input terminal of adder 508 and then connects the output terminal of codebook 507 to the input terminal of adder 510. By this means, switch 505 outputs the code vectors forming codebook 506 to adder 508 as second code vectors, and outputs the code vectors forming codebook 507 to adder 510 as third code vectors. By contrast, if the value of order information $\mathrm{Ord}^{(m)}$ is "1," switch 505 connects the output terminal of codebook 507 to the input terminal of adder 508 and then connects the output terminal of codebook 506 to the input terminal of adder 510. By this means, switch 505 outputs the code vectors forming codebook 507 to adder 508 as second code vectors, and outputs the code vectors forming codebook 506 to adder 510 as third code vectors.

Codebook 506 outputs code vectors $\mathrm{CODE\_2}^{(d2)}(i)$ (i=0, 1, . . . , R−1) designated by designation d2' from error minimizing section 501, to switch 505, among code vectors $\mathrm{CODE\_2}^{(d2)}(i)$ (d2=0, 1, . . . , D2−1, i=0, 1, . . . , R−1) forming the codebook. Here, D2 represents the total number of code vectors of codebook 506, and d2 represents the index of a code vector. Also, error minimizing section 501 sequentially designates the values of d2' from d2'=0 to d2'=D2−1, to codebook 506.

Codebook 507 outputs code vectors $\mathrm{CODE\_3}^{(d3)}(i)$ (d3=0, 1, . . . , D3−1, i=0, 1, . . . , R−1) designated by designation d3' from error minimizing section 501, to switch 505, among code vectors CODE_3$^{(d3)}$(i) (d3=0, 1, . . . , D3−1, i=0, 1, . . . , R−1) forming the codebook. Here, D3 represents the total number of code vectors of codebook 507, and d3 represents the index of a code vector. Also, error minimizing section 501 sequentially designates the values of d3' from d3'=0 to d3'=D3−1, to codebook 507.

According to following equation 21, adder 508 finds the differences between first residual vector Add_Err_1$^{(d1\_min)}$(i) (i=0, 1, . . . , R−1), which is received as input from adder 504 and from which the first additive factor vector is subtracted, and second code vectors CODE_2$nd$(i) (i=0, 1, . . . , R−1) received as input from switch 505, and outputs these differences to error minimizing section 501 as second residual vectors Err_2($i$) (i=0, 1, . . . , R−1). Further, among second residual vectors Err_2($i$) (i=0, 1, . . . , R−1) associated with d2' from d2'=0 to d2'=D2−1 or d3' from d3'=0 to d3'=D3−1, adder 508 outputs the minimum second residual vector found by search in error minimizing section 501, to adder 509. Here, CODE_2$nd$(i) (i=0, 1, . . . , R−1) shown in equation 21 represents one of code vector CODE_2$^{(d2)}$(i) (i=0, 1, . . . , R−1) and code vector CODE_3$^{(d3)}$(i) (i=0, 1, . . . , R−1).

(Equation 21)

$$\text{Err\_2}(i)=\text{Add\_Err\_1}^{(d1\_min)}(i)-\text{CODE\_2}nd(i)\ (i=0,1,\ldots,R-1) \quad [21]$$

Here, error minimizing section 501 sequentially designates the values of d2' from d2'=0 to d2'=D2−1 to codebook 506, or sequentially designates the values of d3' from d3'=0 to d3'=D3−1 to codebook 507. Also, with respect to d2' from d2'=0 to d2'=D2−1 or d3' from d3'=0 to d3'=D3−1, error minimizing section 501 calculates square errors Err by squaring second residual vectors Err_2($i$) (i=0, 1, . . . , R−1) received as input from adder 508, according to following equation 22.

(Equation 22)

$$Err=\sum_{i=0}^{R-1}(\text{Err\_2}(i))^2 \quad [22]$$

Error minimizing section 501 stores index d2' of code vector CODE_2$^{(d2')}$ to minimize square error Err, as second index d2_min, or stores index d3' of code vector CODE_3$^{(d3')}$ to minimize square error Err, as third index d3_min.

According to following equation 23, adder 509 subtracts second additive factor vector Add$^{(m)}$(i) (i=0, 1, . . . , R−1) received as input from additive factor determining section 503, from second residual vector Err_2($i$) (i=0, 1, . . . , R−1) received as input from adder 508, and outputs resulting Add_Err_2($i$) to adder 510. Here, second additive factor vector Add$^{(m)}$(i) (i=0, 1, . . . , R−1) represents one of additive factor vector Add1$^{(m)}$(i) (i=0, 1, . . . , R−1) and additive factor vector Add2$^{(m)}$(i) (i=0, 1, . . . , R−1).

(Equation 23)

$$\text{Add\_Err\_2}(i)=\text{Err\_2}(i)-\text{Add}^{(m)}(i)\ (i=0,1,\ldots,R-1) \quad [23]$$

According to following equation 24, adder 510 finds the differences between second residual vector Add_Err_2($i$) (i=0, 1, . . . , R−1), which is received as input from adder 509 and from which the second additive factor vector is subtracted, and third code vectors CODE_3$rd$(i) (i=0, 1, . . . , R−1) received as input from switch 505, and outputs these differences to error minimizing section 501 as third residual vectors Err_3($i$) (i=0, 1, . . . , R−1). Here, CODE_3$rd$(i) (i=0, 1, . . . , R−1) shown in equation 24 represents one of code vector CODE_2$^{(d2')}$(i) (i=0, 1, . . . , R−1) and code vector CODE_3$^{(d3')}$(i) (i=0, 1, . . . , R−1).

(Equation 24)

$$\text{Err\_3}(i)=\text{Add\_Err\_2}(i)-\text{CODE\_3}rd(i)\ (i=0,1,\ldots,R-1) \quad [24]$$

Here, error minimizing section 501 sequentially designates the values of d2' from d2'=0 to d2'=D2−1 to codebook 506, or sequentially designates the values of d3' from d3'=0 to d3'=D3−1 to codebook 507.

Also, with respect to d2' from d2'=0 to d2'=D2−1 or d3' from d3'=0 to d3'=D3−1, error minimizing section 501 calculates square errors Err by squaring third residual vectors Err_3($i$) (i=0, 1, . . . , R−1) received as input from adder 510, according to following equation 25.

(Equation 25)

$$Err=\sum_{i=0}^{R-1}(\text{Err\_3}(i))^2 \quad [25]$$

Error minimizing section 501 stores index d2' of code vector CODE_2$^{(d2')}$ to minimize square error Err, as second index d2_min, or stores index d3' of code vector CODE_3$^{(d3')}$ to minimize square error Err, as third index d3_min.

Figure 12A:
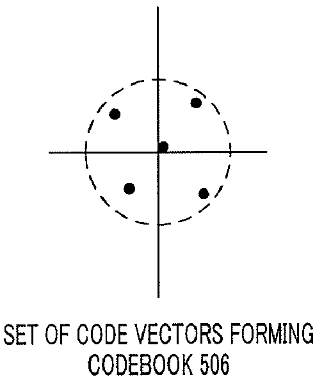
FIG. 12A shows a set of code vectors forming codebook 506 according to Embodiment 3 of the present invention.
Figure 12B:
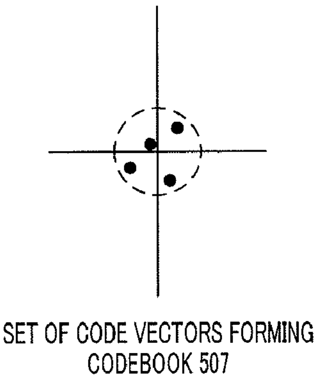
FIG. 12B shows a set of code vectors forming codebook 507 according to Embodiment 3 of the present invention.
Figure 12C:
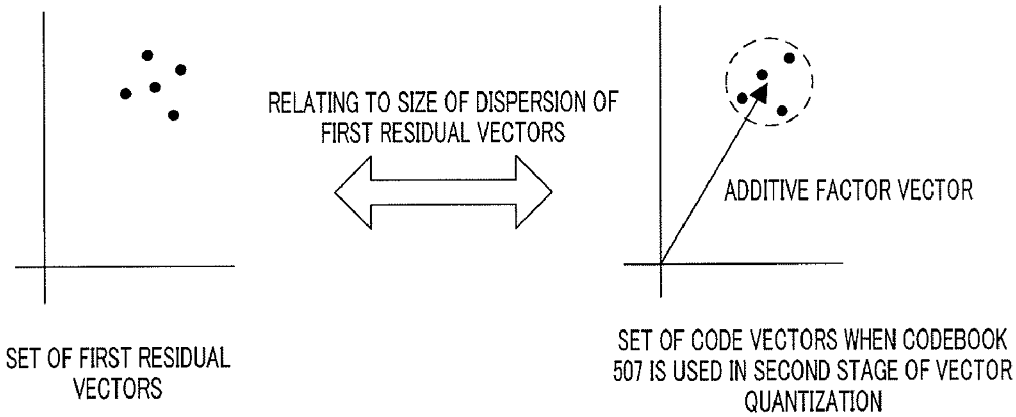
FIG. 12C conceptually shows an effect of LSP vector quantization according to Embodiment 3 of the present invention.

FIGS. 12A to 12C conceptually illustrate the effect of LSP vector quantization according to the present embodiment. Here, FIG. 12A shows a set of code vectors forming codebook 506 (in FIG. 11), and FIG. 12B shows a set of code vectors forming codebook 507 (in FIG. 11). The present embodiment determines the order of use of codebooks to use in second and later stages of vector quantization, to support the types of narrowband LSP's. For example, assume that codebook 507 is selected as a codebook to use in a second stage of vector quantization between codebook 506 shown in FIG. 12A and codebook 507 shown in FIG. 12B, according to the type of a narrowband LSP. Here, the distribution of vector quantization errors in the first stage (i.e. first residual vectors) shown in the left side of FIG. 12C varies according to the type of a narrowband LSP. Therefore, according to the present embodiment, as shown in FIG. 12C, it is possible to match the distribution of a set of first residual vectors to the distribution of a set of code vectors forming a codebook (i.e. codebook 507) selected according to the type of a narrowband LSP. Thus, in a second stage of vector quantization, code vectors suitable for the distribution of first residual vectors are used, so that it is possible to improve the performance in the second stage of vector quantization.

Thus, according to the present embodiment, an LSP vector quantization apparatus determines the order of use of codebooks to use in second and later stages of vector quantization based on the types of narrowband LSP vectors correlated with wideband LSP vectors, and performs vector quantization in second and later stages using the codebooks in accordance with the order of use. By this means, in vector quantization in second and later stages, it is possible to use codebooks suitable for the statistical distribution of vector quantization errors in an earlier stage (i.e. first residual vectors). Therefore, according to the present embodiment, it is possible to improve the accuracy of quantization as in Embodiment 2, and, furthermore, accelerate the convergence of residual vectors in each stage of vector quantization and improve the overall performance of vector quantization.

Also, although a case has been described above with the present embodiment where the order of use of codebooks to use in second and later stages of vector quantization is determined based on order information selected from a plurality items of information stored in an order information codebook included in order determining section 502. However, with the present invention, the order of use of codebooks may be determined by receiving information for order determination from outside LSP vector quantization apparatus 500, or may be determined using information generated by, for example, calculations in LSP vector quantization apparatus 500 (e.g. in order determining section 502).

Also, it is possible to form the LSP vector dequantization apparatus (not shown) supporting LSP vector quantization apparatus 500 according to the present embodiment. In this case, the structural relationship between the LSP vector quantization apparatus and the LSP vector dequantization apparatus is the same as in Embodiment 1 or Embodiment 2. That is, the LSP vector dequantization apparatus in this case employs a configuration of receiving as input encoded data generated in LSP vector quantization apparatus 500, demultiplexing this encoded data in a code demultiplexing section and inputting indices in their respective codebooks. By this means, upon decoding, it is possible to dequantize vectors using accurately quantized encoded information, so that it is possible to generate decoded signals of high quality. Also, although the LSP vector dequantization apparatus in this case decodes encoded data outputted from LSP vector quantization apparatus 500 in the present embodiment, the present invention is not limited to this, and it naturally follows that the LSP vector dequantization apparatus can receive and decode encoded data as long as this encoded data is in a form that can be decoded in the LSP vector dequantization apparatus.

Further, as in Embodiment 1, it naturally follows that the LSP vector quantization apparatus and LSP vector dequantization apparatus according to the present embodiment can be used in a CELP coding apparatus or CELP decoding apparatus for encoding or decoding speech signals, audio signals, and so on.

Embodiments of the present invention have been described above.

Also, the vector quantization apparatus, vector dequantization apparatus, and vector quantization and dequantization methods according to the present embodiment are not limited to the above embodiments, and can be implemented with various changes.

For example, although the vector quantization apparatus, vector dequantization apparatus, and vector quantization and dequantization methods have been described above with embodiments targeting speech signals or audio signals, these apparatuses and methods are equally applicable to other signals.

Also, LSP can be referred to as "LSF (Line Spectral Frequency)," and it is possible to read LSP as LSF. Also, when ISP's (Immittance Spectrum Pairs) are quantized as spectrum parameters instead of LSP's, it is possible to read LSP's as ISP's and utilize an ISP quantization/dequantization apparatus in the present embodiments. Also, when ISF (Immittance Spectrum Frequency) is quantized as spectrum parameters instead of LSP, it is possible to read LSP as ISF and utilize an ISF quantization/dequantization apparatus in the present embodiments.

The vector quantization apparatus and vector dequantization apparatus according to the present invention can be mounted on a communication terminal apparatus and base station apparatus in a mobile communication system that transmits speech, audio and such, so that it is possible to provide a communication terminal apparatus and base station apparatus having the same operational effects as above.

Although example cases have been described with the above embodiments where the present invention is implemented with hardware, the present invention can be implemented with software. For example, by describing the vector quantization method and vector dequantization method according to the present invention in a programming language, storing this program in a memory and making the information processing section execute this program, it is possible to implement the same function as in the vector quantization apparatus and vector dequantization apparatus according to the present invention.

Furthermore, each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2008-007255, filed on Jan. 16, 2008, Japanese Patent Application No. 2008-142442, filed on May 30, 2008, and Japanese Patent Application No. 2008-304660, filed on Nov. 28, 2008, including the specifications, drawings and abstracts, are included herein by reference in their entireties.

INDUSTRIAL APPLICABILITY

The vector quantization apparatus, vector dequantization apparatus, and vector quantization and dequantization methods according to the present invention are applicable to such uses as speech coding and speech decoding.

The invention claimed is:

1. A vector quantization apparatus comprising:

a first selecting section that selects a classification code vector indicating a type of a feature correlated with a quantization target vector, from a plurality of classification code vectors;

a second selecting section that selects a first codebook associated with the selected classification code vector from a plurality of first codebooks;

a first quantization section that quantizes the quantization target vector using a plurality of first code vectors forming the selected first codebook, to produce a first code;

a third selecting section that selects a first additive factor vector associated with the selected classification code vector from a plurality of additive factor vectors; and a second quantization section that quantizes a vector related to a first residual vector between the first code vector indicated by the first code and the quantization target vector, using a plurality of second code vectors and the selected first additive factor vector, to produce a second code.

2. The vector quantization apparatus according to claim 1, wherein the second quantization section generates a subtraction vector by subtracting the selected first additive factor vector from the first residual vector, and quantizes the subtraction vector using the plurality of second code vectors.

3. The vector quantization apparatus according to claim 1, wherein the second quantization section generates a plurality of addition vectors by adding each of the plurality of second code vectors and the selected first additive factor vector, and quantizes the first residual vector using the plurality of addition vectors.

4. The vector quantization apparatus according to claim 1, further comprising a third quantization section that quantizes a second residual vector between the first residual vector and the second code vector, using a plurality of third code vectors and the second additive factor vector, and produces a third code, wherein the third selecting section selects the first additive factor vector and the second additive factor vector associated with the selected classification code vector, from the plurality of additive factor vectors.

5. The vector quantization apparatus according to claim 4, wherein:

the second quantization section generates a plurality of first addition vectors by adding each of the plurality of second code vectors and the first additive factor vector, and quantizes the first residual vector using the plurality of first addition vectors; and the third quantization section generates a plurality of second addition vectors by adding each of the plurality of third code vectors and the second additive factor vector, and quantizes the second residual vector using the plurality of second addition vectors.

6. The vector quantization apparatus according to claim 4, further comprising:

a fourth selecting section that selects order information associated with the selected classification code vector from a plurality items of order information; and a fifth selecting section that selects a codebook formed with the plurality of second code vectors to use in the second quantization section and a codebook formed with the plurality of third code vectors to use in the third quantization section, according to the order information, from a plurality of codebooks formed with a plurality of code vectors, wherein the third selecting section selects the first additive factor vector and the second additive factor vector from the plurality of additive factor vectors, according to the order information.

7. A vector dequantization apparatus comprising:

a receiving section that receives a first code produced by quantizing a quantization target vector in a vector quantization apparatus and a second code produced by further quantizing a quantization error in the quantization in the vector quantization apparatus;

a first selecting section that selects a classification code vector indicating a type of a feature correlated with the quantization target vector, from a plurality of classification code vectors;

a second selecting section that selects a first codebook associated with the selected classification code vector from a plurality of first codebooks;

a first dequantization section that designates a first code vector associated with the first code among a plurality of first code vectors forming the selected first codebook;

a third selecting section that selects a first additive factor vector associated with the selected classification code vector from a plurality of additive factor vectors; and a second dequantization section that designates a second code vector associated with the second code among a plurality of second code vectors, and produces a quantized vector using the designated second code vector, the selected first additive factor vector and the designated first code vector.

8. A vector quantization method comprising the steps of:

selecting a classification code vector indicating a type of a feature correlated with a quantization target vector, from a plurality of classification code vectors;

selecting a first codebook associated with the selected classification code vector from a plurality of first codebooks;

quantizing the quantization target vector using a plurality of first code vectors forming the selected first codebook, to produce a first code;

selecting a first additive factor vector associated with the selected classification code vector from a plurality of additive factor vectors; and quantizing a vector related to a first residual vector between the first code vector indicated by the first code and the quantization target vector, using a plurality of second code vectors and the selected first additive factor vector, to produce a second code.

9. A vector dequantization method comprising the steps of:

receiving a first code produced by quantizing a quantization target vector in a vector quantization apparatus and a second code produced by further quantizing a quantization error in the quantization in the vector quantization apparatus;

selecting a classification code vector indicating a type of a feature correlated with the quantization target vector, from a plurality of classification code vectors;

selecting a first codebook associated with the selected classification code vector from a plurality of first codebooks;

selecting a first code vector associated with the first code from a plurality of first code vectors forming the selected first codebook;

selecting a first additive factor vector associated with the selected classification code vector from a plurality of additive factor vectors; and selecting a second code vector associated with the second code from a plurality of second code vectors, and producing the quantization target vector using the selected second code vector, the selected first additive factor vector and the selected first code vector.

* * * * *